United States Patent
Omata et al.

(10) Patent No.: US 9,106,163 B2
(45) Date of Patent: Aug. 11, 2015

(54) CONTROL DEVICE OF AC MOTOR

(71) Applicant: DENSO CORPORATION, Kariya, Aichi-pref. (JP)

(72) Inventors: Ryuji Omata, Obu (JP); Takeshi Itoh, Nagoya (JP); Hirofumi Kako, Chita-gun (JP)

(73) Assignee: DENSO CORPORATION, Kariya (JP)

( * ) Notice: Subject to any disclaimer, the term of this patent is extended or adjusted under 35 U.S.C. 154(b) by 77 days.

(21) Appl. No.: 14/174,213

(22) Filed: Feb. 6, 2014

(65) Prior Publication Data

US 2014/0225542 A1    Aug. 14, 2014

(30) Foreign Application Priority Data

Feb. 8, 2013   (JP) .................................. 2013-23152

(51) Int. Cl.
| | | |
|---|---|---|
| H02P 1/04 | (2006.01) | |
| H02P 6/00 | (2006.01) | |
| H02H 7/09 | (2006.01) | |
| H02P 21/00 | (2006.01) | |
| H02P 6/08 | (2006.01) | |

(52) U.S. Cl.
CPC .............. *H02P 6/08* (2013.01); *H02P 21/0035* (2013.01)

(58) Field of Classification Search
CPC ............. H02P 6/08; H02P 6/14; H02P 27/04; H02P 6/001; H02P 6/085
USPC ........................ 318/400.09, 400.01, 400.21
See application file for complete search history.

(56) References Cited

U.S. PATENT DOCUMENTS

| | | | | |
|---|---|---|---|---|
| 6,828,744 | B2* | 12/2004 | Na ................................ | 318/432 |
| 7,208,903 | B2* | 4/2007 | Nakai et al. .................. | 318/609 |
| 2003/0227271 | A1* | 12/2003 | Shindo .......................... | 318/439 |
| 2005/0017662 | A1 | 1/2005 | Amakusa | |

(Continued)

FOREIGN PATENT DOCUMENTS

| | | |
|---|---|---|
| JP | 63-268496 | 11/1988 |
| JP | 2002-233199 | 8/2002 |

(Continued)

OTHER PUBLICATIONS

Omata, et al., U.S. Appl. No. 14/174,102, filed Feb. 6, 2014.

(Continued)

*Primary Examiner* — Eduardo Colon Santana
*Assistant Examiner* — Gabriel Agared
(74) *Attorney, Agent, or Firm* — Nixon & Vanderhye PC

(57) ABSTRACT

A control device for controlling a three phase AC motor with an inverter includes: a sensor phase current acquisition device for a sensor phase current sensed value; a rotation angle acquisition device for a rotation angle sensed value; a number-of-revolutions operation device for the revolution number; a current estimation device for a current estimated value; a first voltage command value operation device for a first voltage command value; a voltage command reference value operation device for a voltage command reference value; a second voltage command value operation device for a second voltage command value; a control mode switching device for switching to a first control mode when the revolution number is more than a threshold, and switching to a second control mode when the revolution number is not more than the threshold; and a torque abnormality monitoring device for monitoring an output torque during the second control mode.

7 Claims, 16 Drawing Sheets

(56) References Cited

U.S. PATENT DOCUMENTS

| | | | |
|---|---|---|---|
| 2006/0145652 A1* | 7/2006 | Ta et al. | 318/807 |
| 2007/0024232 A1* | 2/2007 | Suzuki et al. | 318/812 |
| 2008/0079385 A1 | 4/2008 | Hashimoto et al. | |
| 2008/0252242 A1* | 10/2008 | Akama et al. | 318/400.14 |
| 2009/0256518 A1* | 10/2009 | Kitanaka et al. | 318/802 |
| 2011/0080127 A1* | 4/2011 | Akama et al. | 318/400.21 |
| 2012/0001574 A1 | 1/2012 | Akaishi et al. | |
| 2012/0217923 A1* | 8/2012 | Wu et al. | 318/610 |
| 2013/0009572 A1* | 1/2013 | Byun | 318/14 |
| 2013/0314015 A1* | 11/2013 | Hoshi et al. | 318/400.23 |

FOREIGN PATENT DOCUMENTS

| | | |
|---|---|---|
| JP | 2003-219699 | 7/2003 |
| JP | 2004-159391 | 6/2004 |
| JP | 2007-151359 | 6/2007 |
| JP | 2008-254685 | 10/2008 |
| JP | 2008-284977 | 11/2008 |
| JP | 2012-065380 | 3/2012 |

OTHER PUBLICATIONS

Omata, et al., U.S. Appl. No. 14/174,147, filed Feb. 6, 2014.
Omata, et al., U.S. Appl. No. 14/174,159, filed Feb. 6, 2014.
Omata, et al., U.S. Appl. No. 14/174,161, filed Feb. 6, 2014.
Omata, et al., U.S. Appl. No. 14/174,193, filed Feb. 6, 2014.
Omata, et al., U.S. Appl. No. 14/174,200, filed Feb. 6, 2014.
Omata, et al., U.S. Appl. No. 14/174,515, filed Feb. 6, 2014.
Office Action (3 pages) dated Nov. 18, 2014, issued in corresponding Japanese Application No. 2013-023152 and English translation (5 pages).
Office Action (2 pages) dated Jan. 27, 2015, issued in corresponding Japanese Application No. 2013-023303 and English translation (2 pages).

* cited by examiner

CONTROL DEVICE OF AC MOTOR

CROSS REFERENCE TO RELATED APPLICATION

This application is based on Japanese Patent Application No. 2013-23152 filed on Feb. 8, 2013, the disclosure of which is incorporated herein by reference.

TECHNICAL FIELD

The present disclosure relates to a control device of an AC motor.

BACKGROUND

In recent years, from the social requirement of lower fuel consumption and less exhaust emission, an electric automobile and a hybrid automobile, each of which is mounted with an AC motor as a power source of a vehicle, is drawing attention. For example, in some of the hybrid automobiles, a DC power source made of a secondary battery or the like and an AC motor are connected to each other via an electric power conversion device constructed of an inverter and the like, and a DC voltage of the DC power source is converted into an AC voltage by the inverter to thereby drive the AC motor.

In the control device of the AC motor mounted in this kind of hybrid automobile and electric automobile, there has been known a technique in which a current sensor for sensing a phase current is provided in one phase to thereby reduce the number of current sensors, whereby a construction near three phase output terminals of an inverter can be reduced in size and a control system of the AC motor can be reduced in cost (for example, see patent document 1).

In the patent document 1, one phase control is performed in the following manner: a current sensor value of one phase is used for the one phase; and for other phases, three phase AC current command values, which can be acquired by inversely dq transforming a d axis current command value and a q axis current command value on the basis of an electric angle, are used as current estimated values of the other phases. Three phase AC current command values acquired by inversely dq transforming the d axis current command value and the q axis current command value does not become information correctly reflecting the actual current of the AC motor, and hence the control of the AC motor is likely to become unstable. In particular, when the number of revolutions of the AC motor is small, a current change in a current sensed value and a rotation angle movement per a sampling interval become small and hence actual information is scarcer, which hence is likely to make the control of the AC motor more unstable.

In the meantime, considering a current sensor as a kind of torque sensing device of the AC motor, when the AC motor is controlled on the basis of a current sensed value and a rotation angle sensed value, it can be considered that the AC motor is controlled on the basis of an output torque. On the other hand, when control not using a current sensed value (for example, feed forward control) is used for the drive control of the AC motor, it cannot necessarily be said that the AC motor is controlled on the basis of the output torque. When such a control is employed, in order to ensure the same function safety as when the AC motor is controlled on the basis of the current sensed value and the rotation angle sensed value, an output torque needs to be monitored separately. When the output torque from the AC motor is monitored, essentially, it is desirable to directly monitor the output torque on the basis of values converted from the current sensed values of two phases. However, when one phase control is employed, an actual d axis current and an actual q axis current cannot be operated and hence torque conversion is difficult, which hence makes it impossible to directly monitor the output torque.

[Patent Document 1] JP-A No. 2008-86139 (corresponding to US 2008/0079385-A)

SUMMARY

It is an object of the present disclosure to provide a control device of an AC motor that can drive the AC motor stably even in a low rotation range in which the number of revolutions of the AC motor is small and that can monitor an output torque.

According to an aspect of the present disclosure, a control device of a three phase alternating current motor having an applied voltage, which is controlled by an inverter, the control device controls a drive of the motor, and includes: a sensor phase current acquisition device for acquiring a sensor phase current sensed value from a first current sensor, which is disposed on a sensor phase of the motor that is one of three phases of the motor; a rotation angle acquisition device for acquiring a rotation angle sensed value from a rotation angle sensor, which senses a rotation angle of the motor; a number-of-revolutions operation device for operating the number of revolutions of the motor based on the rotation angle sensed value; a current estimation device for operating a current estimated value according to the sensor phase current sensed value and the rotation angle sensed value; a first voltage command value operation device for operating a first voltage command value according to a current command value, which relates to the drive of the motor, and the current estimated value to be fed back; a voltage command reference value operation device for operating a voltage command reference value according to the current command value; a second voltage command value operation device for correcting the voltage command reference value in order to operate a second voltage command value; a control mode switching device for switching a control mode to a first control mode for generating a drive signal, which relates to a drive of the inverter, according to the first voltage command value when the number of revolutions is more than a predetermined switching determination threshold value, and for switching the control mode to a second control mode for generating the drive signal according to the second voltage command value when the number of revolutions is not more than the switching determination threshold value; and a torque abnormality monitoring device for monitoring an output torque, which is outputted from the motor, based on the sensor phase current sensed value when the control mode is the second control mode.

Hence, the above control device corrects the voltage command reference value and operates the second voltage command value and controls the drive of the AC motor in the second control mode based on the second voltage command value in the low rotation range. In this way, the AC motor can be stably controlled in the low rotation range from the time when the AC motor is started and driven until the time when the AC motor is stopped.

Further, the above control device monitors the output torque outputted from the AC motor on the basis of the sensor phase current sensed value. In this way, even in the low rotation range in which the number of revolutions of the AC motor is small, the present disclosure can stably drive the AC motor in the second control mode and can monitor the output torque and can ensure a function safety.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
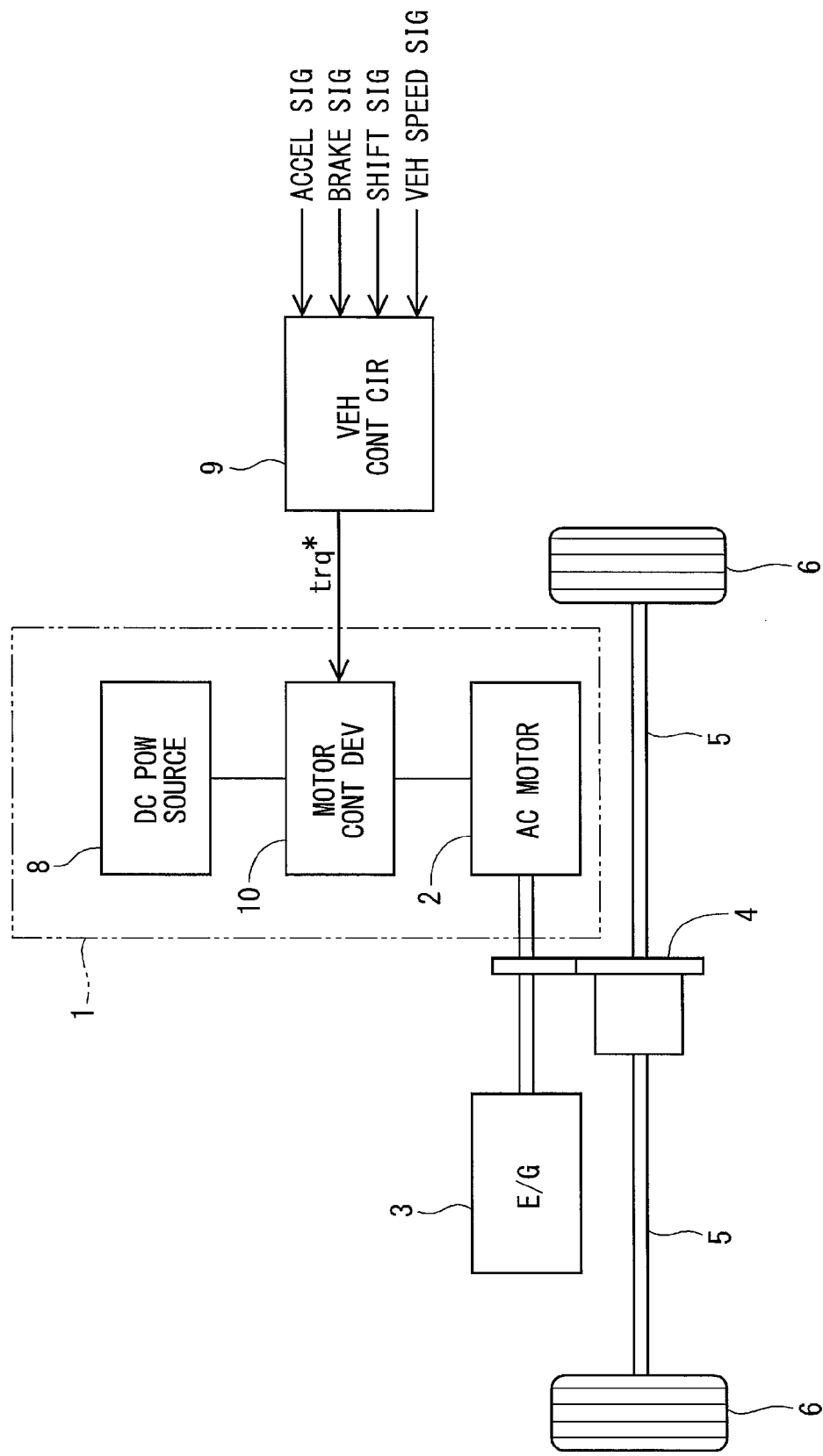
FIG. 1 is a schematic diagram to show a construction of an AC motor drive system of a first embodiment of the present disclosure.

Hereinafter, a control device of an AC motor according to the present disclosure will be described on the basis of the drawings. In this regard, hereinafter in a plurality of embodiments, the substantially same constructions will be denoted by the same reference characters and their descriptions will be omitted.

First Embodiment

As shown in FIG. 1, an electric motor control device 10 as a control device of an AC motor 2 according to a first embodiment of the present disclosure is applied to an electric motor drive system 1 for driving an electric vehicle.

The electric motor drive system 1 includes an AC motor 2, a DC power source 8, the electric motor control device 10, and the like.

The AC motor 2 is, for example, an electric motor for generating torque for driving the driving wheels 6 of the electric vehicle. The AC motor 2 of the present embodiment is a three phase AC motor of a permanent magnet synchronous type.

It is assumed that the electric vehicle includes a vehicle for driving the driving wheels 6 by electric energy such as a hybrid automobile, an electric automobile, and a vehicle powered by a fuel battery. The electric vehicle of the present embodiment is a hybrid vehicle provided with an engine 3, and the AC motor 2 is a so-called motor generator (designated by "MG" in the drawing) having a function as an electric motor that generates torque for driving the driving wheels 6 and a function as a generator that is driven by the kinetic energy of the vehicle, which is transmitted from the engine 3 and the driving wheels 6, and that can generate electricity.

The AC motor 2 is coupled to an axle 5 via a gear 4, for example, a transmission. In this way, the torque generated by the drive of the AC motor 2 rotates the axle 5 via the gear 4 to thereby drive the driving wheels 6.

The DC power source 8 is an electricity storage device that can charge and discharge electricity, for example, a secondary battery such as a nickel metal hydride battery or a lithium ion battery, and an electric double-layer capacitor. The DC power source 8 is connected to an inverter 12 (see FIG. 2) of the electric motor control device 10, that is, the DC power source 8 is so constructed as to supply electricity to the AC motor 2 and to be supplied with electricity from the AC motor 2 via the inverter 12.

A vehicle control circuit 9 is constructed of a microcomputer and the like and is provided therein with a CPU, a ROM, an I/O, and a bass line for connecting these elements, all of which are not shown in the drawings. The vehicle control circuit 9 controls the whole of the electric vehicle by software processing, which is performed by executing previously stored programs by the CPU, and by hardware processing, which is performed by a dedicated electronic circuit.

The vehicle control circuit 9 is so constructed as to be able to acquire signals from various kinds of sensors and switches such as an accelerator signal from an accelerator sensor, a brake signal from a brake switch, and a shift signal from a shift switch, all of which are not shown in the drawings. Further, the vehicle control circuit 9 detects a driving state of the vehicle on the basis of these acquired signals and outputs a torque command value trq* responsive to the driving state to the electric motor control device 10. Further, the vehicle control circuit 9 outputs a command signal to an engine control circuit (not shown) for controlling the drive of the engine 3.

Figure 2:
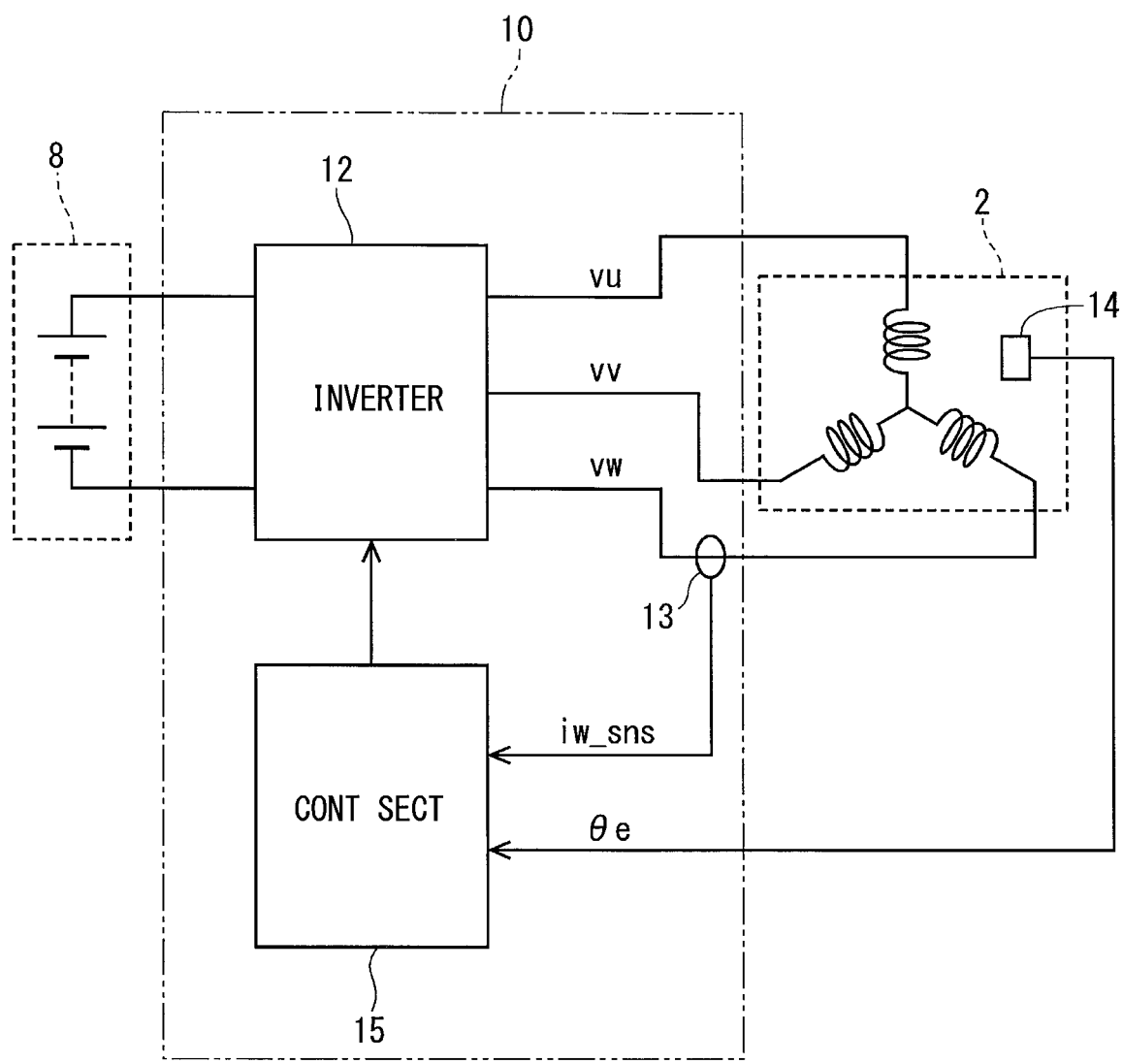
FIG. 2 is a schematic diagram to show a construction of an electric motor control device of the first embodiment of the present disclosure.

As shown in FIG. 2, the electric motor control device 10 includes the inverter 12 and a control section 15.

The inverter 12 has an inverter input voltage VH impressed thereon according to the drive state of the AC motor 2 and to a vehicle request, the inverter input voltage VH being a voltage to which a DC voltage of the DC power source 8 is boosted by a boost converter (not shown). The inverter 12 has six switching elements (not shown) connected in a bridge mode. In more detail, the switching elements are made of upper switching elements (hereinafter referred to as "upper SW") provided on a high electric potential side and lower switching elements (hereinafter referred to as "lower SW") provided on a low electric potential side. The upper SW and the lower SW connected in series are provided in correspondence to the respective phases of the AC motor 2. As to the switching element, for example, an IGBT (Insulated Gate Bipolar Transistor), a MOS (Metal Oxide Semiconductor) transistor, and a bipolar transistor can be used for the switching element. The switching elements are switched on and off on the basis of PWM signals UU, UL, VU, VL, WU, WL outputted from a PWM signal generation part 28 (see FIG. 3) of the control section 15. In this way, the inverter 12 controls three phase AC voltages vu, vv, vw to be impressed on the AC motor 2. When the AC motor 2 has the three phase AC voltages vu, vv, vw, which are generated by the inverter 12, impressed thereon, the AC motor has its drive controlled.

A first current sensor 13 is provided in any one phase of the AC motor 2. In the present embodiment, the first current sensor 13 is provided by one in a W phase, that is, a so-called "one-phase one-channel" construction is employed. Hereinafter, the W phase in which the first current sensor 13 is provided is referred to as "a sensor phase", as required. The first current sensor 13 senses a W phase current sensed value iw_sns, which is made to pass through the W phase of the sensor phase, and outputs the W phase current sensed value iw_sns to the control section 15. The control section 15 acquires the W phase current sensed value iw_sns. Here, in the present embodiment, the first current sensor 13 is provided in the W phase but may be provided in any phase. Hereinafter, in the present embodiment will be described a construction in which the sensor phase is the W phase.

A rotation angle sensor 14 is provided near a rotor (not shown) of the AC motor 2 and senses an electric angle θe and outputs a sensed electric angle θe to the control section 15. The control section 15 acquires the electric angle θe. The rotation angle sensor 14 of the present embodiment is a resolver. In addition, the rotation angle sensor 14 may be an other kind of sensor, for example, a rotary encoder. The electric angle θe of the present embodiment is an angle with a U phase axis as a reference.

Here, a drive control of the AC motor 2 will be described. According to the number of revolutions of the rotor of the AC motor 2 (hereinafter, simply referred to as "the number of revolutions N of the AC motor 2", as required) based on the electric angle θe sensed by the rotation angle sensor 14 and the torque command value trq* from the vehicle control circuit 9, the electric motor control device 10 drives the AC motor 2 as an electric motor to perform a powering operation, thereby consuming electricity, or drives the AC motor 2 as a generator to perform a regenerating operation, thereby generating electricity. Specifically, according to the number of revolutions N and whether the torque command value trq* is plus or minus, the electric motor control device 10 switches the operation of the AC motor 2 into the following four patterns:

<1. Normal rotation/powering operation> when the number of revolutions N is plus and the torque command value trq* is plus, the AC motor 2 consumes electricity;

<2. Normal rotation/regenerating operation> when the number of revolutions N is plus and the torque command value trq* is minus, the AC motor 2 generates electricity;

<3. Reverse rotation/powering operation> when the number of revolutions N is minus and the torque command value trq* is minus, the AC motor 2 consumes electricity; and <4. Reverse rotation/regenerating operation> when the number of revolutions N is minus and the torque command value trq* is plus, the AC motor 2 generates electricity.

When the number of revolutions N>0 (normal rotation) and the torque command value trq*>0, or the number of revolutions N<0 (reverse rotation) and the torque command value trq*<0, the inverter 12 converts the DC electricity supplied from the DC power source 8 to an AC electricity by the switching operation of the switching elements and supplies the AC electricity to the AC motor 2, thereby driving the AC motor 2 in such a way as to output torque (to perform a powering operation).

On the other hand, when the number of revolutions N>0 (normal rotation) and the torque command value trq*<0, or the number of revolutions N<0 (reverse rotation) and the torque command value trq*>0, the inverter 12 converts the AC electricity generated by the AC motor 2 to a DC electricity by the switching operation of the switching elements and supplies the DC electricity to the DC power source 8, whereby the AC motor 2 performs a regenerating operation.

Figure 3:
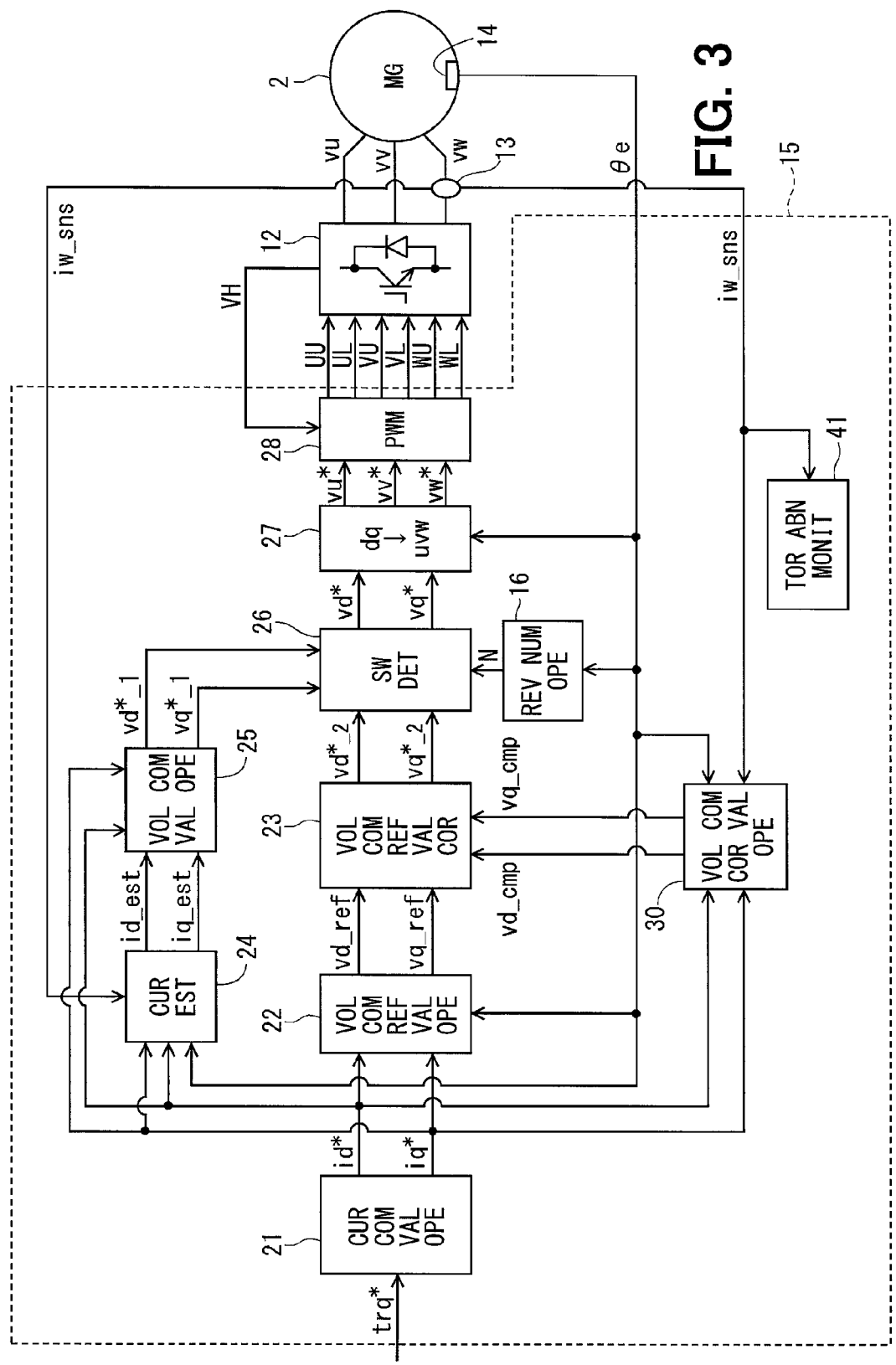
FIG. 3 is a block diagram to show a construction of a control section of the first embodiment of the present disclosure.

Next, the details of the control section 15 will be described on the basis of FIG. 3. As shown in FIG. 3, the control section 15 includes a number-of-revolutions operation part 16, a current command value operation part 21, a voltage command reference value operation part 22, a voltage command reference value correction part 23, a current estimation part 24, a voltage command value operation part 25, a switching determination part 26, a three-phase voltage command value operation part 27, a PWM signal generation part 28, a voltage command correction value operation part 30, a torque abnormality monitoring part 41, and the like.

The number-of-revolutions operation part 16 operates the number of revolutions N of the AC motor 2 on the basis of the electric angle θe. The current command value operation part 21 operates a d axis current command value id* and a q axis current command value iq* in a rotating coordinate system (d-q coordinate system) set as the rotating coordinates of the AC motor 2 on the basis of the torque command value trq* acquired from the vehicle control circuit 9. In the present embodiment, the d axis current command value id* and the q axis current command value iq* are operated with reference to a map stored in advance but may be so constructed as to be operated by the use of a mathematical formula or the like.

The voltage command reference value operation part 22 operates a d axis voltage command reference value vd_ref and a q axis voltage command reference value vq_ref on the basis of the d axis current command value id* and the q axis current command value iq* by the use of a voltage equation that is a theoretical formula of an electric motor. The d axis voltage command reference value vd_ref and the q axis voltage command reference value vq_ref are directly operated from the d axis current command value id* and the q axis current command value iq* and can be also considered as a feed forward term (hereinafter, referred to as "FF").

First, the voltage equation of an electric motor is generally expressed by the following equations (1), (2).

$$vd = Ra \times id + Ld \times (d/dt) \times id - \omega \times Lq \times iq \quad (1)$$

$$vq = Ra \times iq + Lq \times (d/dt) \times iq + \omega \times Ld \times id + \omega \times \Psi \quad (2)$$

Further, when a time differential term (d/dt) expressing a transient property is neglected and the d axis voltage command reference value vd_ref is used as vd and the d axis voltage command value id* is used as id in the equation (1) and the q axis voltage command reference value vq_ref is used as vq and the q axis voltage command value iq* is used as iq in the equation (2), the equations (1), (2) are rewritten by (3), (4).

$$vd\_ref = Ra \times id^* - \omega \times Lq \times iq^* \quad (3)$$

$$vq\_ref = Ra \times iq^* + \omega \times Ld \times id^* + \omega \times \Psi \quad (4)$$

Reference characters in the equations are as follows.
Ra: armature resistance
Ld, Lq: d axis self-inductance, q axis self-inductance
ω: electric angular velocity
Ψ: armature interlinkage flux of permanent magnet In this regard, the armature resistance Ra, the d axis self-inductance Ld and the q axis self-inductance Lq, and the armature interlinkage flux Ψ of a permanent magnet, which are machine constants of the AC motor 2, may be set at fixed values or may be calculated by calculation. Further, values close to actual characteristics and actual measured values of the machine constants may be expressed in a map and the machine constants may be operated on the basis of the torque command value trq* (or the d axis current command value id* and the q axis current command value iq*).

The electric angular velocity ω is operated by the voltage command reference value operation part 22 on the basis of the electric angle θe. Further, the electric angular velocity ω may be operated from the number of revolutions N.

Here, when the number of revolutions N is 0 [rpm], the electric angular velocity ω also becomes 0 [rad/s] and hence ω terms in the equations (3), (4) become zero and only resistance terms remain. Depending on the value of the armature resistance Ra and the current command value, the resistance terms become values close to zero. Further, there is a case where a theoretical voltage command reference value calculated from the voltage equation is made different from a voltage command value relating to the actual drive of the AC motor 2, which generates torque according to the command, by a physical factor and the like relating to the AC motor 2 and the electric motor control device 10. For this reason, it is desirable to appropriately correct the d axis voltage command reference value vd_ref and the q axis voltage command reference value vq_ref in such a way that the AC motor 2 can be started. Hence, in the present embodiment, the d axis voltage command reference value vd_ref and the q axis voltage command reference value vq_ref are corrected by the voltage command reference value correction part 23.

The voltage command reference value correction part 23 corrects the d axis voltage command reference value vd_ref and the q axis voltage command reference value vq_ref and operates a second d axis voltage command value vd*_2 and a second q axis voltage command value vq*_2. In the present embodiment, the voltage command reference value correction part 23 corrects the d axis voltage command reference value vd_ref and the q axis voltage command reference value vq_ref on the basis of a d axis voltage command correction value vd_cmp and a q axis voltage command correction value vq_cmp, which are operated by the voltage command correction value operation part 30 to be described later, and operates the second d axis voltage command value vd*_2 and the second q axis voltage command value vq*_2. The second d axis voltage command value vd*_2 and the second q axis voltage command value vq*_2 will be shown in equations (5), (6).

$$vd^*\_2 = vd\_ref + vd\_cmp \quad (5)$$

$$vq^*\_2 = vq\_ref + vq\_cmp \quad (6)$$

The current estimation part 24 operates a d axis current estimated value id_est and a q axis current estimated value iq_est on the basis of the W phase current sensed value iw_sns and the electric angle θe. In the present embodiment, the current estimation part 24 operates the d axis current estimated value id_est and the q axis current estimated value iq_est on the basis of the d axis current command value id* and the q axis current command value iq* as well as the W phase current sensed value iw_sns and the electric angle θe. Specifically, the current estimation part 24 makes a U phase current command value iu* and a V phase current command value iv*, which are calculated by inversely dq transforming the d axis current command value id* and the q axis current command value iq*, a U phase current estimated value iu_est and a V phase current estimated value iv_est. Then, the current estimation part 24 dq transforms the U phase current estimated value iu_est, the V phase current estimated value iv_est, and the W phase current sensed value iw_sns to operate the d axis current estimated value id_est and the q axis current estimated value iq_est.

A method for operating the d axis current estimated value id_est and the q axis current estimated value iq_est is not limited to this method, but any method may be employed which operates the d axis current estimated value id_est and the q axis current estimated value iq_est on the basis of the W phase current sensed value iw_sns and the electric angle θe. Further, the U phase current estimated value iu_est and the V phase current estimated value iv_est may be operated by any method or do not need to be operated if they are not required for the operation of the d axis current estimated value id_est and the q axis current estimated value iq_est.

The voltage command value operation part 25 operates a d axis current deviation Δid that is a difference between the d axis current estimated value id_est, which is fed back from the current estimation part 24, and the d axis current command value id* and operates a first d axis voltage command value vd*_1 by an PI operation in such a way that the d axis current deviation Δid converges to 0 [A] so as to make the d axis current estimated value id_est follow the d axis current command value id*. Further, the voltage command value operation part 25 operates a q axis current deviation Δiq that is a difference between the q axis current estimated value iq_est, which is fed back from the current estimation part 24, and the q axis current command value iq* and operates a first q axis voltage command value vq*_1 by the PI operation in such a way that the q axis current deviation Δiq converges to 0 [A] so as to make the q axis current estimated value iq_est follow the q axis current command value iq*.

The switching determination part 26 switches between the selection of the first d axis voltage command value vd*_1 and the first q axis voltage command value vq*_1 as the d axis voltage command value vd* and the q axis voltage command value vq* and the selection of the second d axis voltage command value vd*_2 and the second q axis voltage command value vq*_2 as the d axis voltage command value vd* and the q axis voltage command value vq*, the d axis voltage command value vd* and the q axis voltage command value vq* being used for the operation of drive signals (PWM signals UU, UL, VU, VL, WU, WL to be described later) relating to the drive of the inverter 12. In the present embodiment, when the number of revolutions N is more than a given switching determination threshold value A, the switching determination part 26 selects the first d axis voltage command value vd*_1 and the first q axis voltage command value vq*_1 as the d axis voltage command value vd* and the q axis voltage command value vq*. Further, when the number of revolutions N is not more than the given switching determination threshold value A, the switching determination part 26 selects the second d axis voltage command value vd*_2 and the second q axis voltage command value vq*_2 as the d axis voltage command value vd* and the q axis voltage command value vq*.

The three phase voltage command value operation part 27 inversely dq transforms the d axis voltage command value vd* and the q axis voltage command value vq* to a U phase voltage command value vu*, a V phase voltage command value vv*, and a W phase voltage command value vw* on the basis of the electric angle θe acquired by the rotation angle sensor 14.

The PWM signal generation part 28 operates the PWM signals UU, UL, VU, VL, WU, WL relating to the switching on and off of the switching elements of the inverter 12 on the basis of the three phase AC voltage command values vu*, vv*, vw* and an inverter input voltage VH to be impressed on the inverter 12.

Then, when the switching elements of the inverter 12 are switched on and off on the basis of the PWM signals UU, UL, VU, VL, WU, WL, the three phase AC voltages vu*, vv*, vw* are generated, and when the three phase AC voltages vu, vv, vw are impressed on the AC motor 2, the drive of the AC motor 2 is controlled in such a way that torque responsive to the torque command value trq* is outputted. Here, the three phase AC voltages vu, vv, vw correspond to "impressed voltages".

The voltage command correction value operation part 30 operates the d axis voltage command correction value vd_cmp and the q axis voltage command correction value vq_cmp, which correspond to a difference between a theoretical voltage command reference value calculated from the voltage equation and the voltage command value relating to the actual drive of the AC motor 2, which generates torque according to the command. The d axis voltage command correction value vd_cmp and the q axis voltage command correction value vq_cmp are operated, for example, on the basis of the electric angle θe, the W phase current sensed value iw_sns, the d axis current command value id*, and the q axis current command value iq*. The d axis voltage command correction value vd_cmp and the q axis voltage command correction value vq_cmp may be any values, if they can correct the d axis voltage command reference value vd_ref and the q axis voltage command reference value vq_ref. For example, the d axis voltage command correction value vd_cmp and the q axis voltage command correction value vq_cmp may be set at values corresponding to a voltage error caused by a dead time set so as to prevent a short circuit from being caused when the upper and lower switching elements are switched on at the same time. Further, for example, the d axis voltage command correction value vd_cmp and the q axis voltage command correction value vq_cmp may be operated by a map operation or the like based on actual data.

Further, the voltage command correction value operation part 30 may operate a coefficient K by which the equations (5), (6) are multiplied. Then, the voltage command reference value correction part 23 may multiply the equations (5), (6) by the coefficient K to thereby correct the d axis voltage command reference value vd_ref and the q axis voltage command reference value vq_ref and may operate the second d axis voltage command value vd*_2 and the second q axis voltage command value vq*_2. The coefficient K may be any value and may be, for example, a ratio between a W phase current command value iw*, which is a W phase component of the d axis current command value id* and the q axis current command value iq*, and the W phase current sensed value iw_sns.

When the number of revolutions N is not more than a switching determination threshold value A, that is, when a control mode is an FF control mode which selects the second d axis voltage command value vd*_2 and the second q axis voltage command value vq*_2 as the d axis voltage command value vd* and the q axis voltage command value vq* respectively and which will be described later, the torque abnormality monitoring part 41 monitors whether or not an abnormality is caused in an output torque outputted from the AC motor 2. The monitoring of an abnormality in the output torque by the torque abnormality monitoring part 41 will be described later.

Figure 4:
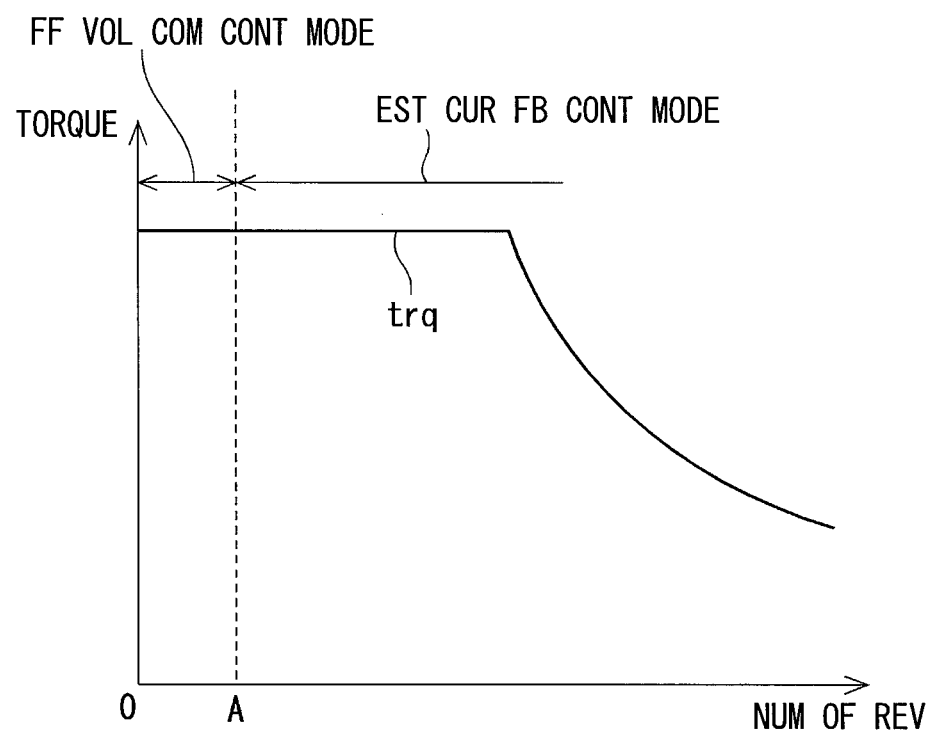
FIG. 4 is a diagram to show switching of a control mode according to the number of revolutions in the first embodiment of the present disclosure.

Here, the switching of a control mode according to the number of revolutions N in the present embodiment will be described on the basis of FIG. 4.

When the number of revolutions N is not more than the switching determination threshold value A, a control mode of generating the PWM signals UU, UL, VU, VL, WU, WL of drive signals relating to the drive of the inverter 12 on the basis of the second d axis voltage command value vd*_2 and the second q axis voltage command value vq*_2 and of controlling the drive of the AC motor 2 by the PWM signals UU, UL, VU, VL, WU, WL is assumed to be "an FF voltage command control mode (hereinafter, referred to as "an FF control mode", as required).

When the number of revolutions N is more than the switching determination threshold value A, a control mode of generating the PWM signals UU, UL, VU, VL, WU, WL relating to the drive of the inverter 12 on the basis of the first d axis voltage command value vd*_1 and the first q axis voltage command value vq*_1 and of controlling the drive of the AC motor 2 by the PWM signals UU, UL, VU, VL, WU, WL is assumed to be "an estimated current feedback control mode (hereinafter, feedback is described as "FB", as required). The estimated current FB control can be also considered as a one phase control using a current sensed value of one phase (the current sensed value of the W phase in the present embodiment). In this regard, in the present embodiment, considering that the current sensor is provided in one phase, each of "the estimated current FB control" and "the FF control" can be also considered as "one phase control" in the broad sense of term.

In the present embodiment, "the estimated current FB control mode" corresponds to "a first control mode" and "the FF voltage command control (FF control) mode" corresponds to "a second control mode".

Figure 5A:
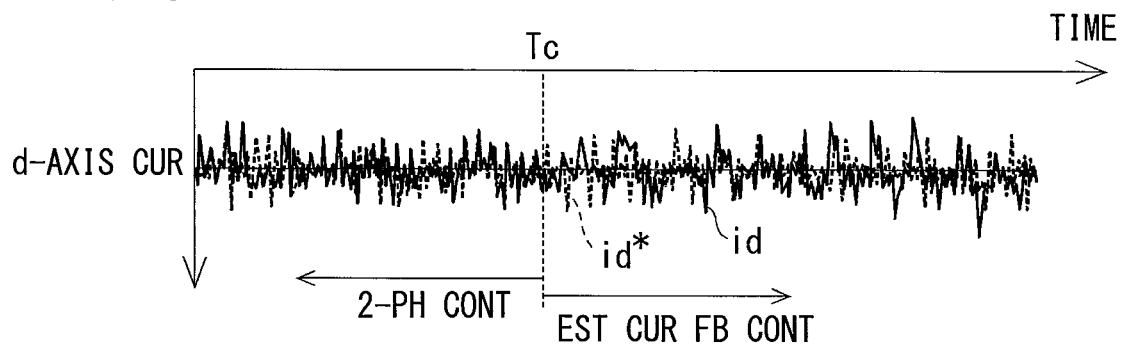
FIGS. 5A to 5C are time charts to illustrate a movement of an AC motor in a high rotation range.
Figure 5B:
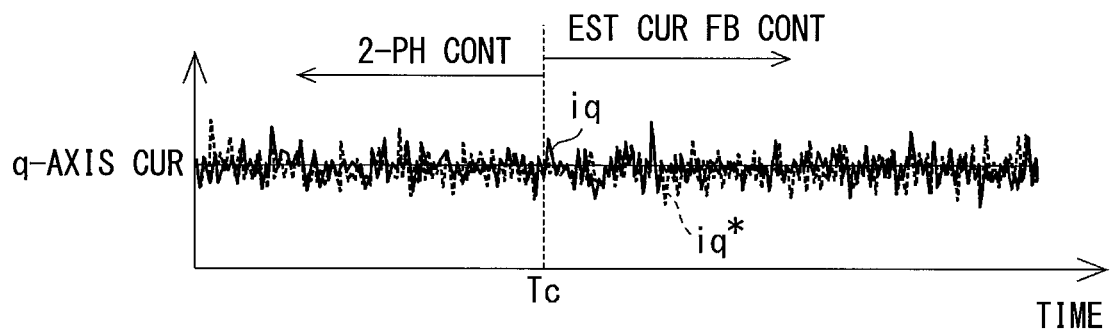
Figure 5C:
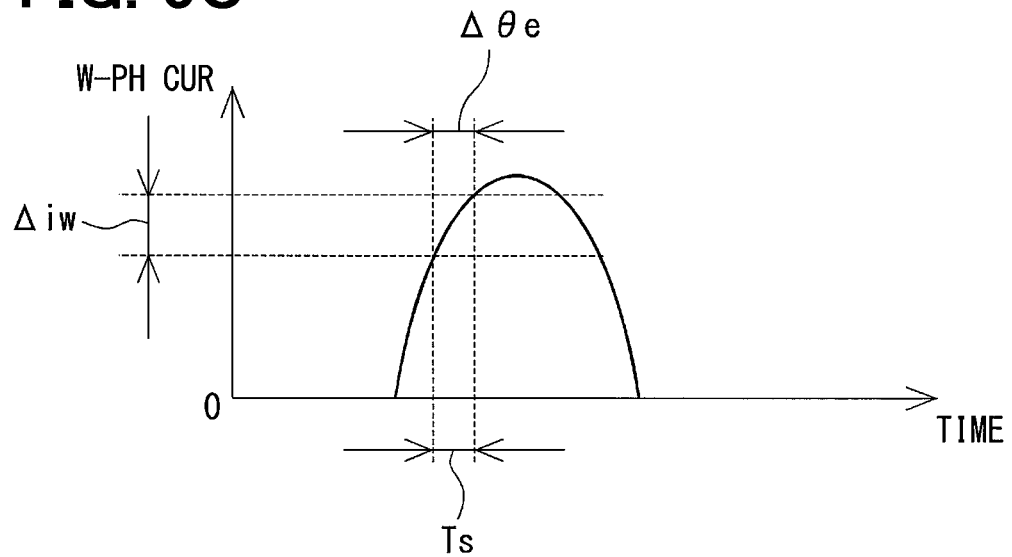
Figure 6A:
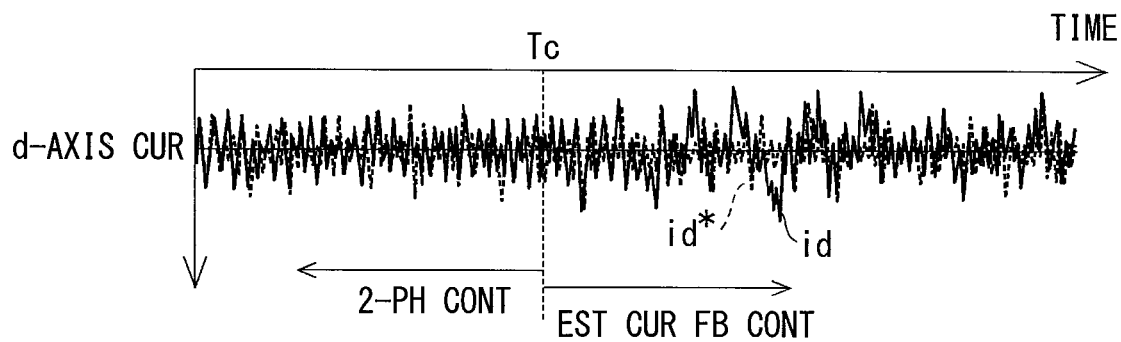
FIGS. 6A to 6C are time charts to illustrate a movement of an AC motor in a middle rotation range.
Figure 6B:
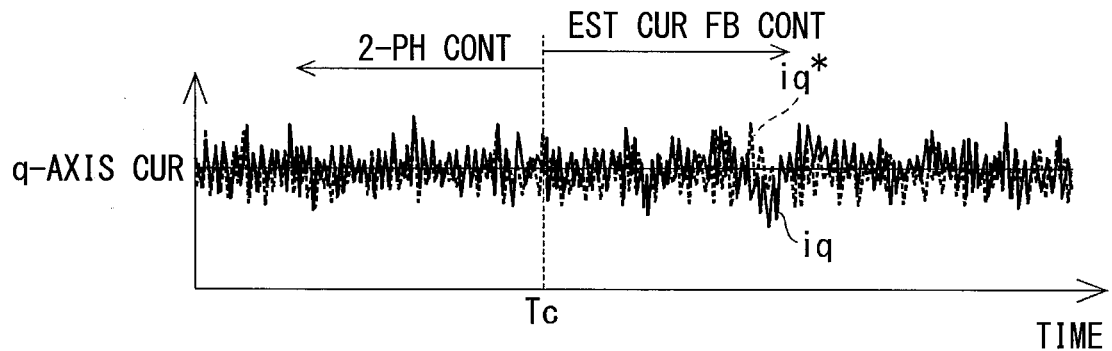
Figure 6C:
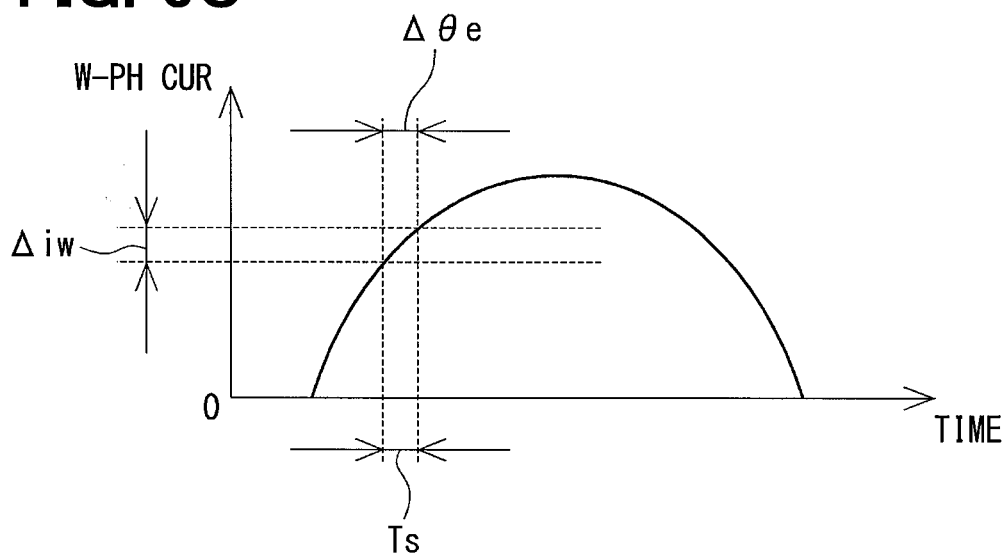
Figure 7A:
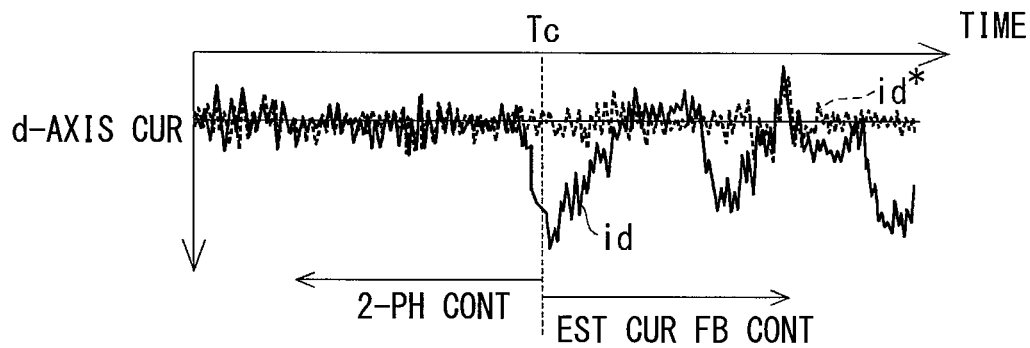
FIGS. 7A to 7C are time charts to illustrate a movement of an AC motor in a low rotation range.
Figure 7B:
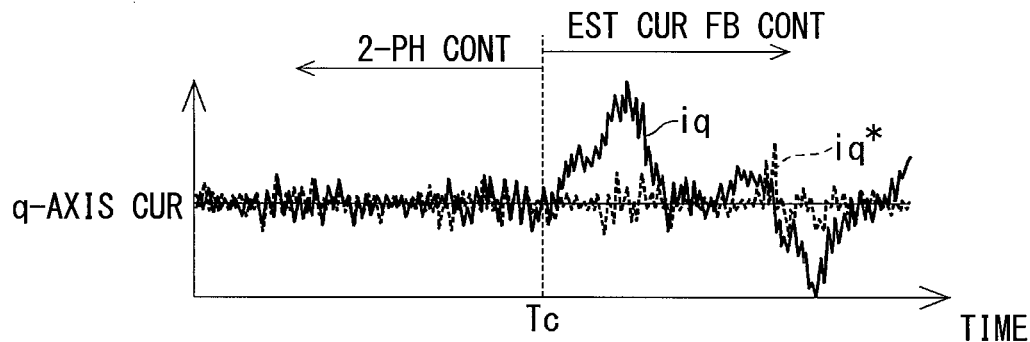
Figure 7C:
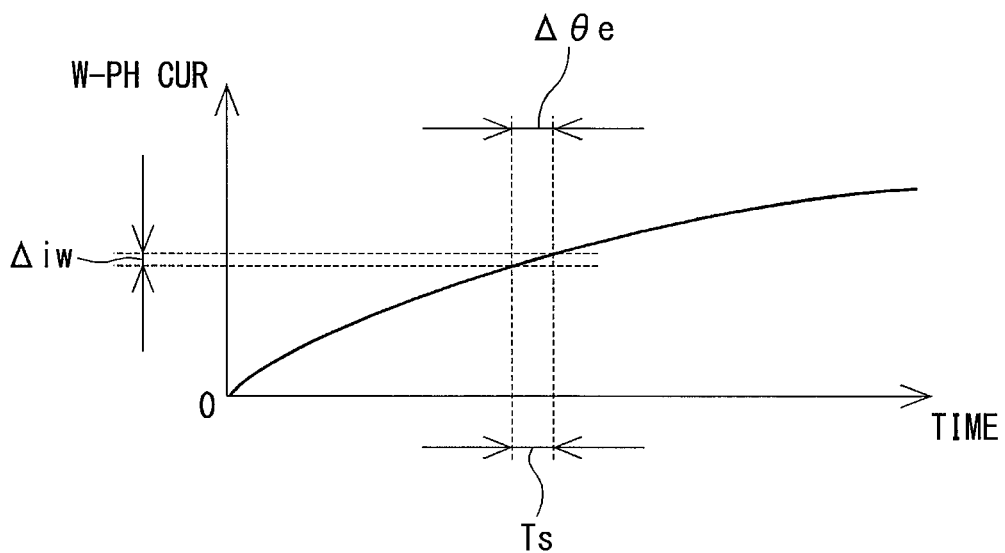

Here, the estimated current FB control mode will be described on the basis of FIGS. 5A, 5B, 5C to FIGS. 7A, 7B, 7C. FIGS. 5A, 5B, 5C are examples of a high rotation range, FIGS. 6A, 6B, 6C are examples of a middle rotation range, and FIGS. 7A, 7B, 7C are examples of a low rotation range. Here, "the high rotation, the middle rotation, and the low rotation" are used only in a comparative meaning and do not mean a specific number of revolutions. In other words, when it is assumed that: the number of revolutions in FIGS. 5A, 5B, 5C is N1; the number of revolutions in FIGS. 6A, 6B, 6C is N2; and the number of revolutions in FIGS. 7A, 7B, 7C is N3, the relationship among N1, N2, and N3 is simply N1≥N2≥N3. Further, in FIGS. 5A to 5C to FIGS. 7A to 7C, a sampling interval Ts is assumed to be the same. In FIGS. 5A, 5B, 5C to FIGS. 7A, 7B, 7C, FIGS. 5A, 6A, and 7A illustrate a d axis current, FIGS. 5B, 6B, and 7B illustrate a q axis current, and FIGS. 5C, 6C, and 7C illustrate a relationship between an electric angle movement Δθe and a current change Δiw and a sampling interval Ts. Further, in FIGS. 5A, 6A, and 7A and FIGS. 5B, 6B, and 7B, a d axis actual current value id and a q axis actual current value iq are denoted by a solid line, whereas a d axis current command value id* and a q axis current command value iq* are denoted by a broken line. Still further, each of FIGS. 5A, 6A, and 7A and FIGS. 5B, 6B, and 7B shows a case where a two phase control based on the current sensed values of two phases each of which has the current sensor provided therein is performed in a first step before a time Tc and where the two phase control is switched to an estimated current FB control based on the current sensed value of one phase (the current sensed value iw_sns of the W phase in the present embodiment) at the time Tc.

As shown in FIGS. 5A and 5B, when the two phase control is switched to the estimated current FB control in a high rotation range in which the number of revolutions N is high, a d axis actual current value id and a q axis actual current value iq in the estimated current FB control is not much different in a fluctuation range from the d axis actual current value id and the q axis actual current value iq in the two phase control.

This is because of the following: as shown in FIG. 5C, when the sampling interval Ts is the same irrespective of the number of revolutions N, the electric angle movement $\Delta\theta e$ and the current change $\Delta iw$ at the sampling interval Ts become comparatively large values and hence easily reflect actual information also in the estimated current FB control.

On the other hand, as shown in FIGS. 6A and 6B, when the two phase control is switched to the estimated current FB control in the middle rotation range in which the number of revolutions is middle, the d axis actual current value id and the q axis actual current value iq in the estimated current FB control is larger in the fluctuation range from the d axis actual current value id and the q axis actual current value iq in the two phase control and hence the control becomes unstable.

This is because of the following: as shown in FIG. 6C, the electric angle movement $\Delta\theta e$ and the current change $\Delta iw$ at the sampling interval Ts become smaller than those in the high rotation range in which the number of revolutions N is high and hence actual information becomes scarce.

Further, as shown in FIGS. 7A and 7B, when the two phase control is switched to the estimated current FB control in the low rotation range, the d axis actual current value id and the q axis actual current value iq in the estimated current FB control are further larger in the fluctuation range than those when the number of revolutions N is in the middle rotation range and hence the control becomes more unstable.

As shown in FIG. 7C, when the number of revolutions N is small, the electric angle movement $\Delta\theta e$ and the current change $\Delta iw$ at the sampling interval Ts become close to zero. This is because of the following: in the present embodiment, the U phase current command value iu* is used as the U phase current estimated value iu_est and the V phase current command value iv* is used as the V phase current estimated value iv_est, so that when the current change $\Delta iw$ of a value varied for a command becomes 0 [A] approximately, the d axis current estimated value id_est and the q axis current estimated value iq_est, which are fed back, are hardly varied.

In this way, when the number of revolutions N is in the low rotation range, the electric angle movement $\Delta\theta e$ and the current change $\Delta iw$ at the sampling interval Ts become small. In other words, actual information reflected to the d axis current estimated value id_est and the q axis current estimated value iq_est, which are fed back, become scarce. For this reason, the d axis current estimated value id_est and the q axis current estimated value iq_est, which are fed back, are reduced in an estimation accuracy, so that when the estimated current FB control is performed in the low rotation range, the AC motor 2 may not be able to be stably driven.

Hence, in the present embodiment, when the number of revolutions N is not more than the given switching determination threshold value A, an FF control based on the second d axis voltage command value vd*_2 and the second q axis voltage command value vq*_2, in each of which an FF term is corrected, is performed in place of the estimated current FB control.

In the meantime, when the first current sensor 13 is considered as a kind of torque sensing device of the AC motor 2, in the estimated current FB control mode for controlling the AC motor 2 on the basis of the W phase current sensed value iw_sns, it can be considered to control the AC motor 2 on the basis of the output torque. In other words, in the estimated current FB control mode, it can be considered to monitor the output torque.

On the other hand, in the FF control mode, there is a case where the W phase current sensed value iw_sns is not used for the operation of the second d axis voltage command value vd*_2 and the second q axis voltage command value vq*_2. In this case, it cannot necessarily be said that the AC motor 2 is controlled on the basis of the output torque. For this reason, in the FF control mode, in order to ensure the same function safety as the estimated current FB control mode, the output torque needs to be monitored separately.

Hence, in the present embodiment, when the number of revolutions N is not more than the switching determination threshold value A, that is, in the case of the FF control mode, the torque abnormality monitoring part 41 monitors an abnormality in the output torque. Essentially, it is desirable to monitor the output torque by the value of torque to which the current sensed values of two phases are converted. However, in the present embodiment, the first current sensor 13 is provided in only one phase (W phase in the present embodiment) and hence the d axis actual current id and the q axis actual current iq cannot be operated, so that torque conversion is difficult and hence the output torque cannot be directly monitored. Further, in the FF control mode, a torque estimated value trq_est cannot be operated on the basis of the W phase current sensed value iw_sns and the other phase current estimated value (the U phase current estimated value iu_est or the V phase current estimated value iv_est), either.

Figure 8:
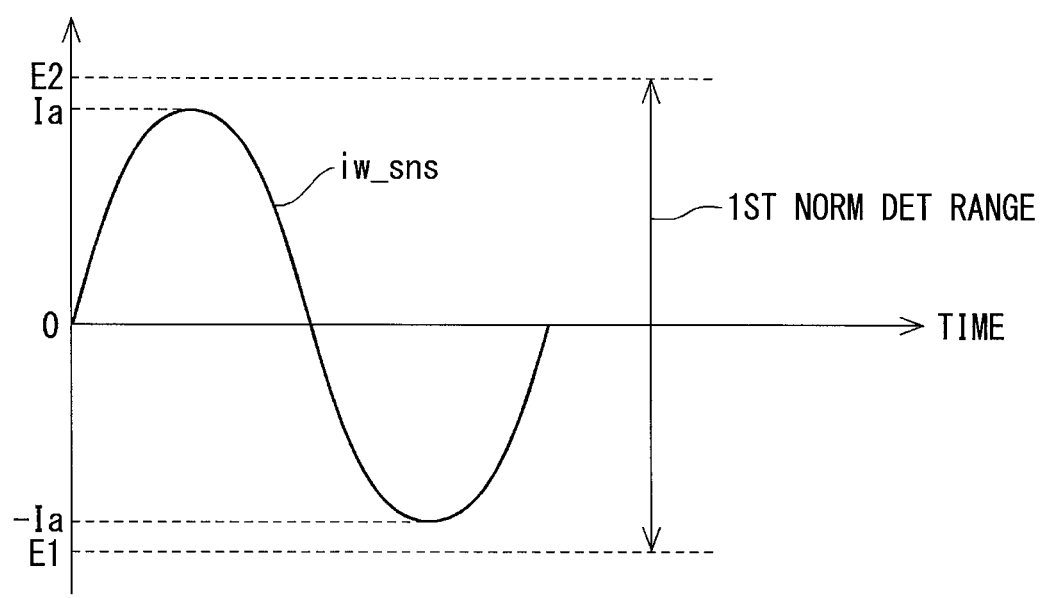
FIG. 8 is a graph to illustrate an output torque abnormality determination according to the first embodiment of the present disclosure.

For this reason, in the present embodiment, considering that an output torque trq is expressed by an equation (7), when the W phase current sensed value iw_sns is within a first normality determination range as shown in FIG. 8, the output torque is considered to be normal. Further, when the W phase current sensed value iw_sns is outside the first normality determination range, it is determined that an abnormality is caused in the output torque: in more detail, it is determined that an excess torque abnormality in which the output torque is excessively large is caused. In this regard, $\Psi$ in the following equation (7) is armature interlinkage flux and K is a coefficient that expresses coefficients to be produced in operation as a whole.

$$\text{trq}=K\times\Psi\times Ia \tag{7}$$

In an example shown in FIG. 8, it is determined that the first normality determination range is not less than a threshold value E1 and not more than a threshold value E2, and when the W phase current sensed value iw_sns is not less than the threshold value E1 and not more than the threshold value E2, the output torque is considered to be normal. Further, when the W phase current sensed value iw_sns is less than the threshold value E1 or more than the threshold value E2, it is determined that an abnormality is caused in the output torque. In the present embodiment, when the W phase current sensed value iw_sns is less than the threshold value E1 or more than the threshold value E2, it is determined that "the W phase current sensed value iw_sns is outside the first normality determination range".

Further, it is also recommended to determine an abnormality in output torque on the basis of an absolute value of the W phase current sensed value iw_sns. That is, when the absolute value of the W phase current sensed value iw_sns is not more than a threshold value E3, it may be determined that the output torque is normal, and when the absolute value of the W phase current sensed value iw_sns is more than the threshold value E3, it may be determined that an abnormality is caused in the output torque. In this case, when the absolute value of the W phase current sensed value iw_sns is more than the threshold value E3, it is determined that "the W phase current sensed value iw_sns is outside the first normality determination range".

Here, drive control processing of the AC motor 2 according to the present embodiment will be described on the basis of a flow chart shown in FIG. 9. The processing shown in FIG. 9 is performed by the control section 15.

Figure 9:
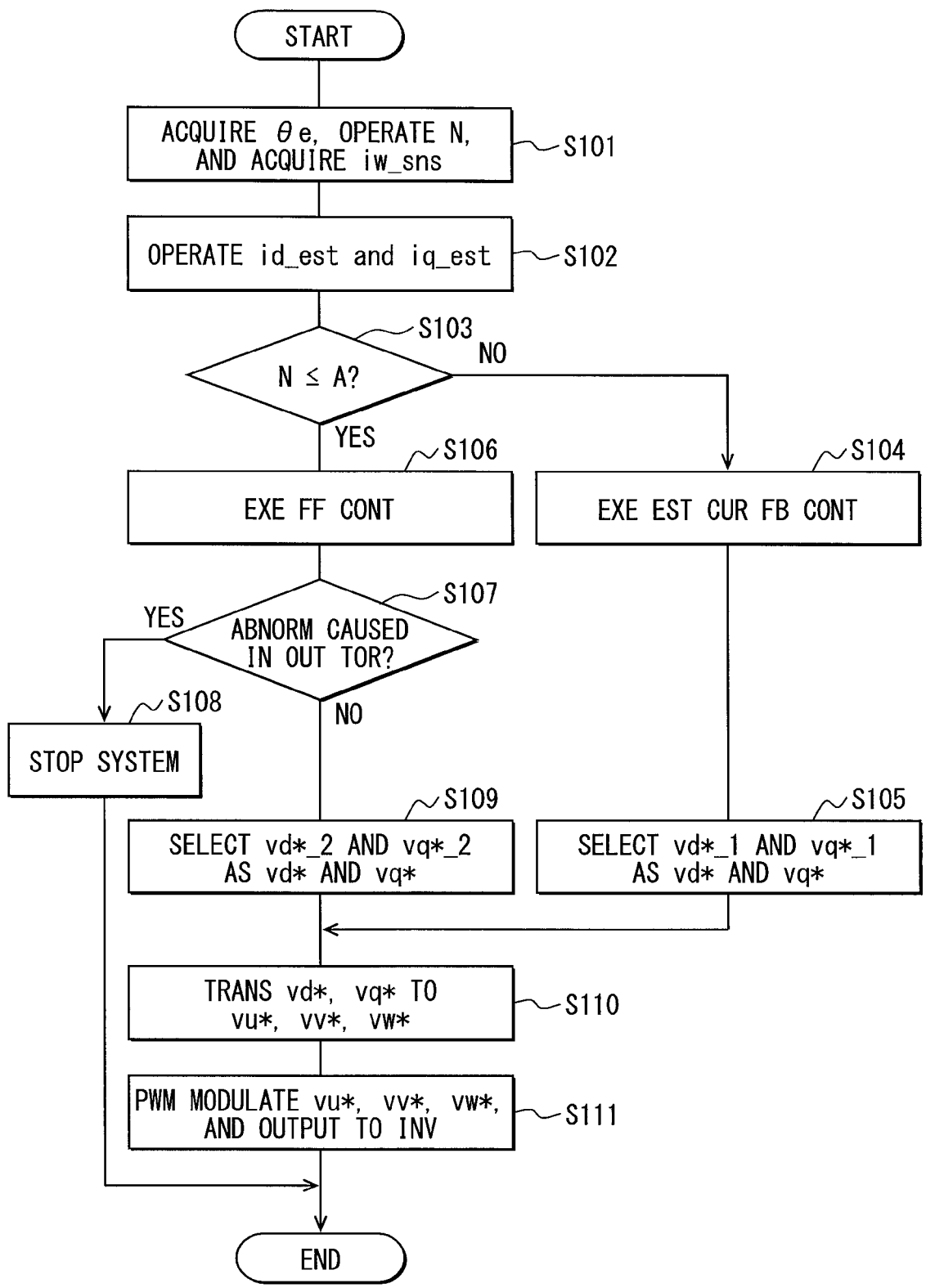
FIG. 9 is a flow chart to show drive control processing according to the first embodiment of the present disclosure.

As shown in FIG. 9, in the first step S101 (hereinafter, "step" will be omitted and simply designated by a symbol "S"), the electric angle θe is acquired from the rotation angle sensor 14 and the number of revolutions N is operated. Further, the W phase current sensed value iw_sns is acquired from the first current sensor 13.

In S102, the current estimation part 24 operates the d axis current estimated value id_est and the q axis current estimated value iq_est on the basis of the W phase current sensed value iw_sns and the electric angle θe. In the present embodiment, the current estimation part 24 operates the d axis current estimated value id_est and the q axis current estimated value iq_est on the basis of the d axis current command value id* and the q axis current command value iq* as well as the W phase current sensed value iw_sns and the electric angle θe. In the present embodiment, the current estimation part 24 always operates the d axis current estimated value id_est and the q axis current estimated value iq_est irrespective of the number of revolutions N.

In S103, it is determined whether or not the number of revolutions N is not more than the switching determination threshold value A. If it is determined that the number of revolutions N is not more than the switching determination threshold value A (S103: YES), the routine proceeds to S106. If it is determined that the number of revolutions N is more than the switching determination threshold value A (S103: NO), the routine proceeds to S104.

In S104, the estimated current FB control is performed and the voltage command value operation part 25 operates the first d axis voltage command value vd*_1 and the first q axis voltage command value vq*_1 on the basis of the d axis current command value id* and the q axis current command value iq* and the d axis current estimated value id_est and the q axis current estimated value iq_est. Here, when an affirmative determination is made in S103 of the processing just before S104, that is, when the FF control is performed until just before, it is desirable that in the PI operation, the last d axis voltage command value vd* and the last q axis voltage command value vq* are set as the initial values of a PI integral term. In this way, when FF term correction processing is switched to estimated current FB control processing, it is possible to prevent the d axis voltage command value vd* and the q axis voltage command value vq* from being suddenly changed.

In S105, the switching determination part 26 selects the first d axis voltage command value vd*_1 as the d axis voltage command value vd* and selects the first q axis voltage command value vq*_1 as the q axis voltage command value vq*.

In S106 to which the routine proceeds when it is determined that the number of revolutions N is not more than the switching determination threshold value A (S103: YES), the FF control is performed in place of the estimated current FB control: that is, the voltage command reference value operation part 22 and the voltage command reference value correction part 23 operate the second d axis voltage command value vd*_2 and the second q axis voltage command value vq*_2.

In S107, the torque abnormality monitoring part 41 determines on the basis of the W phase current sensed value iw_sns whether or not an abnormality is caused in the output torque. In the present embodiment, whether or not an abnormality is caused in the output torque is determined on the basis of whether or not the W phase current sensed value iw_sns is within the first normality determination range. If it is determined that an abnormality is not caused in the output torque (S107: NO), that is, if the W phase current sensed value iw_sns is not less than the threshold value E1 and not more than the threshold value E2, the routine proceeds to S109. If it is determined that an abnormality is caused in the output torque (S107: YES), that is, if the W phase current sensed value iw_sns is less than the threshold value E1 or more than the threshold value E2, the routine proceeds to S108.

In S108, information to the effect that an abnormality is caused in the output torque is outputted to the vehicle control circuit 9 and the control by the electric motor control device 10 is stopped (system is stopped). In this regard, it is also recommended not to stop the system, but to take an action to shift the control to a backup control.

In S109 to which the routine proceeds when it is determined that an abnormality is not caused in the output torque (S107: NO), the switching determination part 26 selects the second d axis voltage command value vd*_2 as the d axis voltage command value vd* and selects the second q axis voltage command value vq*_2 as the q axis voltage command value vq*.

In S110, the three phase voltage command value operation part 27 inversely dq transforms the d axis voltage command value vd* and the q axis voltage command value vq* on the basis of the electric angle θe to thereby operate three phase voltage command values vu*, vv*, vw*.

In S111, the PWM signal generation part 28 PWM modulates the three phase voltage command values vu*, vv*, vw* on the basis of the inverter input voltage VH to thereby calculate PWM signals UU, UL, VU, VL, WU, WL and outputs the PWM signals UU, UL, VU, VL, WU, WL to the inverter 12.

Then, when the switching elements of the inverter 12 are switched on and off on the basis of the PWM signals UU, UL, VU, VL, WU, WL, the three phase AC voltages vu, vv, vw are generated, and then when the three phase AC voltages vu, vv, vw are impressed on the AC motor 2, the torque responsive to the torque command value trq* is outputted by the AC motor 2.

As described above in detail, the electric motor control device 10 of the present embodiment controls the drive of the three phase AC motor 2 having the impressed voltages vu, vv, vw controlled by the inverter 12.

In the control section 15 of the electric motor control device 10, the following processing is performed. The W phase current sensed value iw_sns is acquired from the first current sensor 13 provided in the sensor phase of any one phase (W phase in the present embodiment) of the AC motor 2 (S101 in FIG. 9). Further, the electric angle θe is acquired from the rotation angle sensor 14 for sensing the rotation angle of the AC motor 2 (S101).

The number-of-revolutions operation part 16 operates the number of revolutions N of the AC motor 2 on the basis of the electric angle θe (S101).

The current estimation part 24 operates the d axis current estimated value id_est and the q axis current estimated value iq_est on the basis of the W phase current sensed value iw_sns and the electric angle θe (S102). In the present embodiment, the current estimation part 24 operates the d axis current estimated value id_est and the q axis current estimated value iq_est on the basis of the d axis current command value id* and the q axis current command value iq* as well as the W phase current sensed value iw_sns and the electric angle θe. Further, the voltage command value operation part 25 operates the first d axis voltage command value vd*_1 and the first q axis voltage command value vq*_1 on the basis of the d axis current command value id* and the q axis current command value iq*, which relate to the drive of the AC motor 2, and the d axis current estimated value id_est and the q axis current estimated value iq_est, which are fed back (S104).

The voltage command reference value operation part 22 operates the d axis voltage command reference value vd_ref and the q axis voltage command reference value vq_ref on the basis of the d axis current command value id* and the q axis current command value iq*. In the present embodiment, the voltage command reference value operation part 22 operates the d axis voltage command reference value vd_ref and the q axis voltage command reference value vq_ref by the use of the theoretical formula of the electric motor. Further, the voltage command reference value correction part 23 corrects the d axis voltage command reference value vd_ref and the q axis voltage command reference value vq_ref and operates the second d axis current command value vd*_2 and the second q axis current command value vq*_2 (S106).

If the number of revolutions N is more than the given switching determination threshold value A (S103: NO), the switching determination part 26 switches the control mode to the estimated current FB control mode for generating the PWM signals UU, UL, VU, VL, WU, WL relating to the drive of the inverter 12 on the basis of the first d axis current command value vd*_1 and the first q axis current command value vq*_1. On the other hand, if the number of revolutions N is not more than the given switching determination threshold value A, the switching determination part 26 switches the control mode to the FF control mode for generating the PWM signals UU, UL, VU, VL, WU, WL on the basis of the second d axis current command value vd*_2 and the second q axis current command value vq*_2.

When the control mode is the FF control mode, that is, if the number of revolutions N is not more than the given switching determination threshold value A (S103: YES), the torque abnormality monitoring part 41 monitors the output torque outputted from the AC motor 2 on the basis of the W phase current sensed value iw_sns.

In the present embodiment, the first current sensor 13 is provided in the W phase and the current sensors of the U phase and the W phase are omitted, that is, the number of current sensors can be reduced. In this way, the construction near the three phase output terminals of the inverter 12 can be reduced in size and the cost of the electric motor control device 10 can be reduced.

When the control mode is switched to the estimated current FB control mode for feeding back the d axis current estimated value id_est and the q axis current estimated value iq_est, which are estimated by the use of the current sensed value iw_sns of one phase (W phase in the present embodiment), to thereby control the drive of the AC motor 2, in the low rotation range in which the number of revolutions N is small, the electric angle movement Δθe and the current change Δiw per the sampling interval Ts become small and actual information becomes scarce, so that the control is likely to be made unstable.

For this reason, in the present embodiment, in the low rotation range in which the number of revolutions N is not more than the switching determination threshold value A, the estimated current FB control is not used but the d axis voltage command reference value vd_ref and the q axis voltage command reference value vq_ref are operated by the use of the theoretical formula of the electric motor (for example, voltage equation) or the map stored in advance on the basis of the d axis current command value id* and the q axis current command value iq*. However, there is a case where a theoretical voltage command reference value is made different from a voltage command value relating to the actual drive of the AC motor 2, which generates torque according to the command, by a physical factor and the like relating to the AC motor 2 and the electric motor control device 10. In particular, when the drive of the AC motor 2 is controlled on the basis of a theoretical d axis voltage command reference value vd_ref and a theoretical q axis voltage command reference value vq_ref in the low rotation range in which the AC motor 2 is started or stopped, there is a possibility that an impressed voltage to be impressed on the AC motor 2 is not adequate and hence the AC motor 2 may not be able to be stably driven.

Hence, in the present embodiment, the d axis voltage command reference value vd_ref and the q axis voltage command reference value vq_ref are corrected to thereby operate the second d axis voltage command value vd*_2 and the second q axis voltage command value vq*_2, and in the low rotation range, the drive of the AC motor 2 is controlled on the basis of the second d axis voltage command value vd*_2 and the second q axis voltage command value vq*_2. In this way, in the low rotation range, the AC motor 2 can be stably controlled from the time when the AC motor 2 is started and driven until the time when the AC motor 2 is stopped.

Further, considering the first current sensor 13 as a kind of torque sensing device of the AC motor 2, it can be considered that in the estimated current FB control mode for controlling the AC motor 2 on the basis of the W phase current sensed value iw_sns and the electric angle θe, the AC motor 2 is controlled on the basis of the output torque. On the other hand, in the FF control mode, there is a case where the W phase current sensed value iw_sns is not used for the operation of the second d axis voltage command value vd*_2 and the second q axis voltage command value vq*_2. In this case, it cannot necessarily be said that the AC motor 2 is controlled on the basis of the output torque. For this reason, in order to secure the same function safety as in the estimated current FB control, the output torque of the AC motor 2 needs to be monitored separately. When the output torque of the AC motor 2 is monitored, for example, it is desired that an actual torque is directly monitored on the basis of the values sensed by the current sensors of two phases. However, in the present embodiment, the first current sensor 13 is provided in only one phase (W phase in the present embodiment) and hence the d axis actual current value id and the q axis actual current value iq cannot be operated, so that torque conversion is difficult and hence the output torque cannot be directly monitored.

Hence, in the present embodiment, the output torque outputted from the AC motor 2 is monitored on the basis of the W phase current sensed value iw_sns. Specifically, in the present embodiment, when the W phase current sensed value iw_sns is outside the normality determination range, it is determined that an abnormality is caused in the output torque.

In this way, even in the low rotation range in which the number of revolutions N of the AC motor 2 is small, the AC motor 2 can be driven in the FF control mode and hence the output torque can be monitored and the function safety can be ensured.

In the present embodiment, the control section 15 constructs "a sensor phase current acquisition device", "a rotation angle acquisition device", "a number-of-revolutions operation device", "a current estimation device", "a first voltage command value operation device", "a voltage command reference value operation device", "a second voltage command value operation device", "a control mode switching device", and "a torque abnormality monitoring device". In more detail, the number-of-revolutions operation part 16 constructs "the number-of-revolutions operation device", the current estimation part 24 constructs "the current estimation device", the voltage command value operation part 25 constructs "the first voltage command value operation device", the voltage command reference value operation part 22 constructs "the voltage command reference value operation device", the voltage command reference value correction part 23 constructs "the second voltage command value operation device", the switching determination part 26 constructs "the control mode switching device", and the torque abnormality monitoring part 41 constructs "the torque abnormality monitoring device".

Further, S101 shown in FIG. 9 corresponds to processing as the functions of "the sensor phase current acquisition device", "the rotation angle acquisition device", and "the number-of-revolutions operation device", S102 corresponds to processing as the function of "the current estimation device", S104 corresponds to processing as the function of "the first voltage command value operation device", S106 corresponds to processing as the functions of "the voltage command reference value operation device" and "the second voltage command value operation device", S105 and S109 correspond to processing as the function of "the control mode switching device", and S107 corresponds to processing as the function of "the torque abnormality monitoring device".

The W phase corresponds to "a sensor phase", the W phase current sensed value iw_sns corresponds to "a sensor phase current sensed value", the electric angle θe corresponds to "a rotation angle sensed value", each of the d axis current estimated value id_est and the q axis current estimated value iq_est corresponds to "a current estimated value", each of the d axis current command value id* and the q axis current command value iq* corresponds to "a current command value", and each of the first d axis voltage command value vd*_1 and the first q axis voltage command value vq*_1 corresponds to "a first voltage command value". Each of the d axis voltage command reference value vd_ref and the q axis voltage reference value vd_ref corresponds to "a voltage command reference value", and each of the second d axis voltage command value vd*_2 and the second q axis voltage command value vq*_2 corresponds to "a second voltage command value". Further, each of the PWM signals UU, UL, VU, VL, WU, WL corresponds to "a drive signal".

Second Embodiment

Embodiments from a second embodiment to a fifth embodiment are different from the embodiment described above in the torque abnormality monitoring part and hence this different point will be mainly described.

Figure 10:
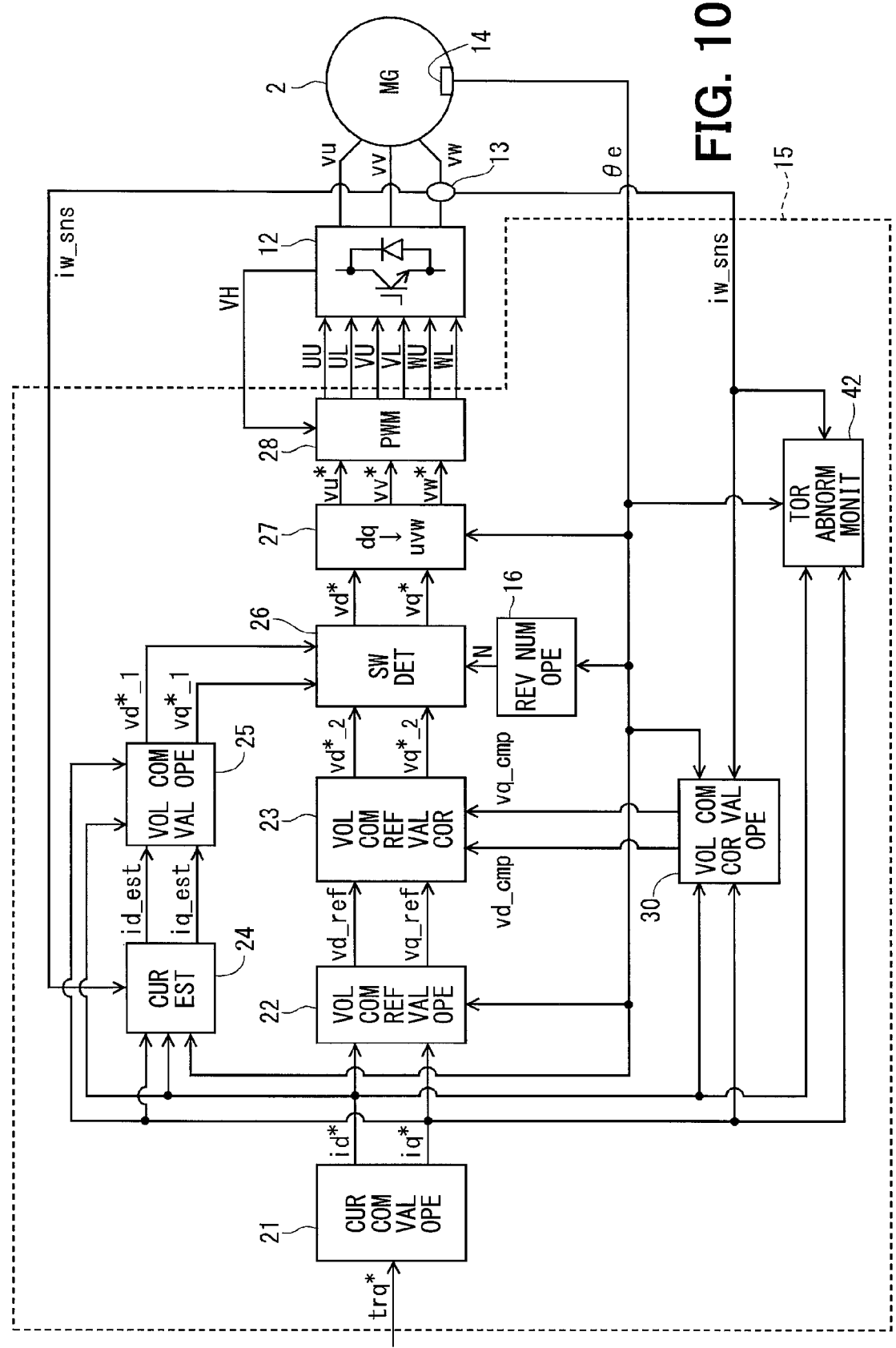
FIG. 10 is a block diagram to show a construction of a control section of a second embodiment of the present disclosure.

A control section 15 according to the second embodiment of the present embodiment will be shown in FIG. 10. A torque abnormality monitoring part 42 of the present embodiment operates an amplitude Ia of the W phase current sensed value iw_sns. It is assumed that a second normality determination range is not less than a threshold value E11 and not more than a threshold value E12. If the amplitude Ia is not less than the threshold value E11 and not more than the threshold value E12, it is determined that the output torque is normal. Further, if the amplitude Ia is less than the threshold value E11 or more than the threshold value E12, it is determined that an abnormality is caused in the output torque. In the present embodiment, if the amplitude Ia is less than the threshold value E11 or more than the threshold value E12, it is determined that that the amplitude Ia is outside a second normality determination range".

The amplitude Ia may be operated by any method. For example, the amplitude Ia can be operated on the basis of the d axis current command value id* and the q axis current command value iq* in the following manner. First, the W phase current sensed value iw_sns can be expressed by an equation (8.1). φ in the equation is a current phase of a current vector i based on the q axis in the d-q coordinates.

$$iw\_sns = Ia \cdot \sin(\theta e + 240° + \phi) \quad (8.1)$$

Further, when the equation (8.1) is generalized without specifying the definition of a reference axis, the equation (8.1) is expressed by an equation (8.2).

$$iw\_sns = Ia \times \sin(\theta e + C + \phi) \quad (8.2)$$

However, C in the equation is a constant according to the phase of a sensor axis with respect to the reference axis of the electric angle θe. In the present embodiment, the electric angle θe is an angle formed by a U phase axis and a (+d) axis on the basis of the U phase axis as a reference axis and is defined in a counterclockwise direction from 0 [°]. Further, a W phase axis is shifted as an electric angle by 240 [°] with respect to the U phase axis and hence the constant C in the present embodiment is 240 [°].

Further, a reference sine wave iw_ref of a sine wave having an amplitude of 1 is expressed by an equation (9.1). φ* in the equation is a current phase of a current command vector i* based on the q axis in the d-q coordinates and can be operated from the d axis current command value id* and the q axis current command value iq*.

$$iw\_ref = 1 \times \sin(\theta e + 240 + \phi^*) \quad (9.1)$$

When the equation (9.1) is generalized without specifying the definition of a reference axis as in the case of the equation (8.2), the equation (9.1) is expressed by an equation (9.2).

$$iw\_ref = 1 = \times \sin(\theta e + C + \phi^*) \quad (9.2)$$

Here, assuming that the current phase φ of a current vector i is nearly equal to the current phase φ* of the current command vector i* in the d-q coordinates, the amplitude Ia is operated by an equation (10.1).

$$Ia = iw\_sns / iw\_ref \quad (10)$$

In this regard, when the W phase current sensed value iw_sns or the reference sine wave iw_ref crosses zero, the amplitude Ia cannot be correctly operated because of "zero multiplication" of multiplying something by zero and "zero division" of dividing something by zero. For this reason, when the W phase current sensed value iw_sns or the reference sine wave iw_ref is within a zero crossing range, it is desired to stop monitoring an abnormality in the output torque so as to prevent a false detection. Whether or not the W phase current sensed value iw_sns or the reference sine wave iw_ref is within the zero crossing range may be determined on the basis of the W phase current sensed value iw_sns or the reference sine wave iw_ref or may be determined on the basis of a phase angle obtained by adding the current phase φ or a current command phase φ* to the electric angle θe or on the basis of the electric angle θe.

Referring to a flow chart, in S107 shown in FIG. 9, when the W phase current sensed value iw_sns and the reference sine wave iw_ref are not within the zero crossing range, the amplitude Ia of the W phase current sensed value iw_sns is operated. Further, when the amplitude Ia is not less than the threshold value E11 and not more than the threshold value E12, it is determined that the an abnormality is not caused in the output torque and a negative determination is made in S107 and the routine proceeds to S109. When the amplitude Ia is less than the threshold value E11 or more than the threshold value E12, it is determined that an abnormality is caused in the output torque and an affirmative determination is made in S107 and the routine proceeds to S108. In this regard, when the W phase current sensed value iw_sns and the reference sine wave iw_ref are within the zero crossing range, a negative determination is made in S107 and the routine proceeds to S109.

In the present embodiment, when the amplitude Ia of the W phase current sensed value iw_sns is outside a second normality determination range (S107: YES), it is determined that an abnormality is caused in the output torque.

This construction can also produce the same effects as the embodiments described above.

Further, in the embodiments described above, substantially, an abnormality in the output torque can be detected near a peak of the W phase current sensed value iw_sns, but in the present embodiment, an abnormality in the output torque can be detected within an angle range except for the zero crossing range of the W phase current sensed value iw_sns. Still further, in the present embodiment, not only when the output torque is excessively large but also when the output torque is excessively small, it can be determined that an abnormality is caused in the output torque.

In the present embodiment, the torque abnormality monitoring part 42 constructs "a torque abnormality monitoring device".

Third Embodiment

Figure 11:
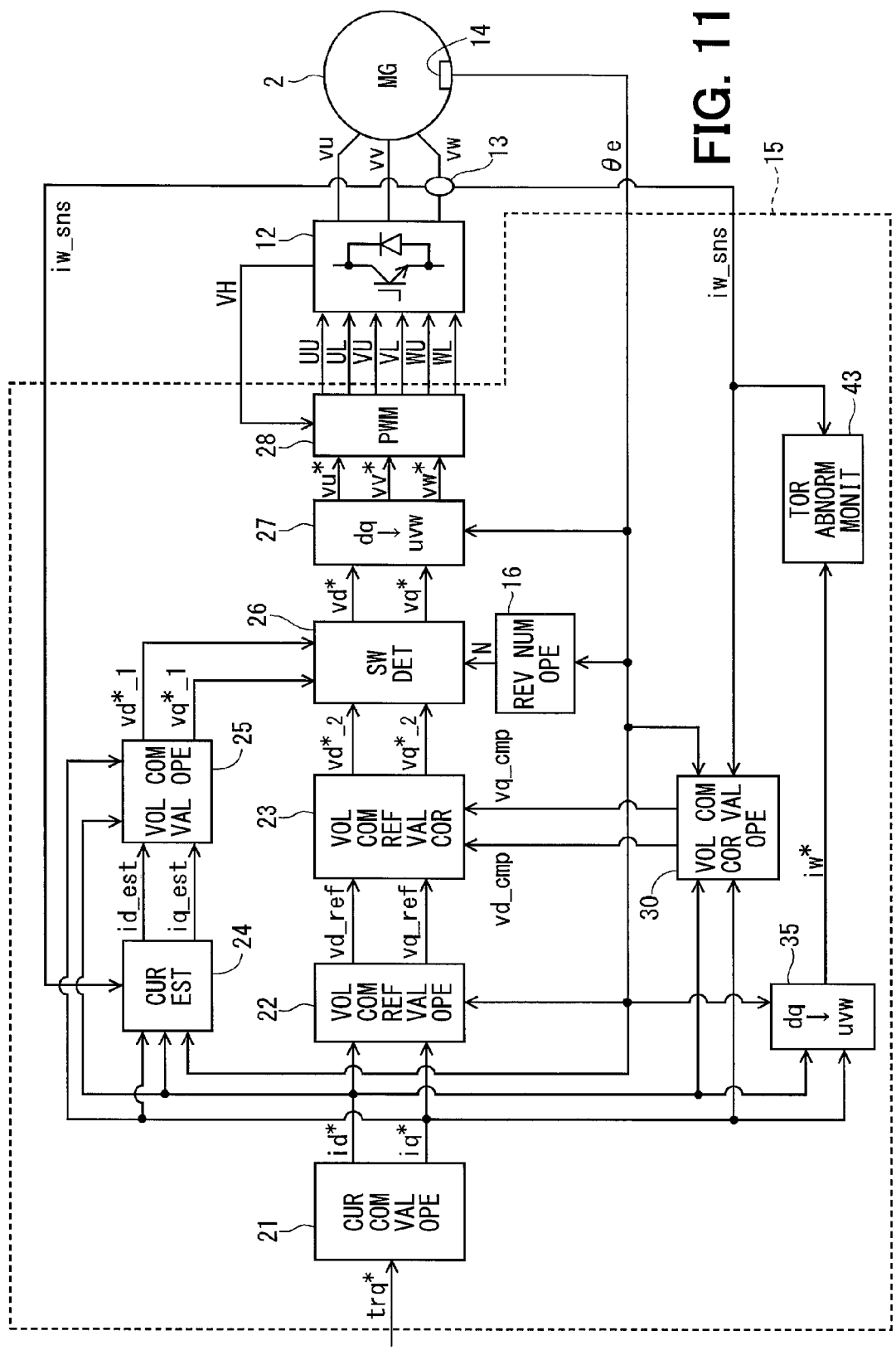
FIG. 11 is a block diagram to show a construction of a control section of a third embodiment of the present disclosure.

A control section 15 according to a third embodiment of the present disclosure will be shown in FIG. 11.

The control section 15 of the present embodiment includes a three phase current command value operation part 35 in addition to the embodiments described above.

The three phase current command value operation part 35 inversely dq transforms the d axis current command value id* and the q axis current command value iq* to a W phase current command value iw* on the basis of the electric angle θe. The three phase current command value operation part 35 outputs the W phase current command value iw* to a torque abnormality monitoring part 43.

Figure 12A:
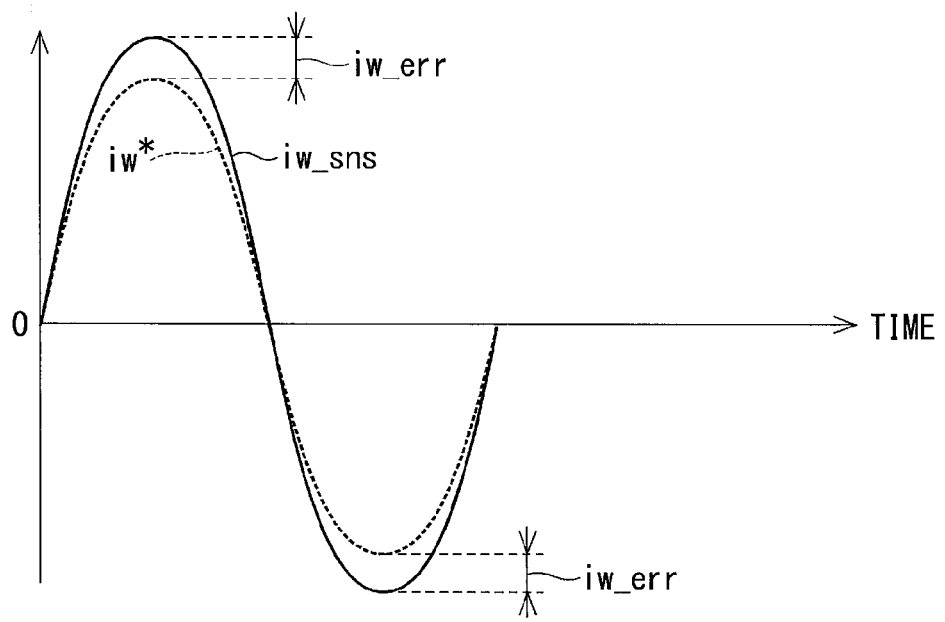
FIGS. 12A and 12B are graphs to illustrate an output torque abnormality determination according to the third embodiment of the present disclosure.
Figure 12B:
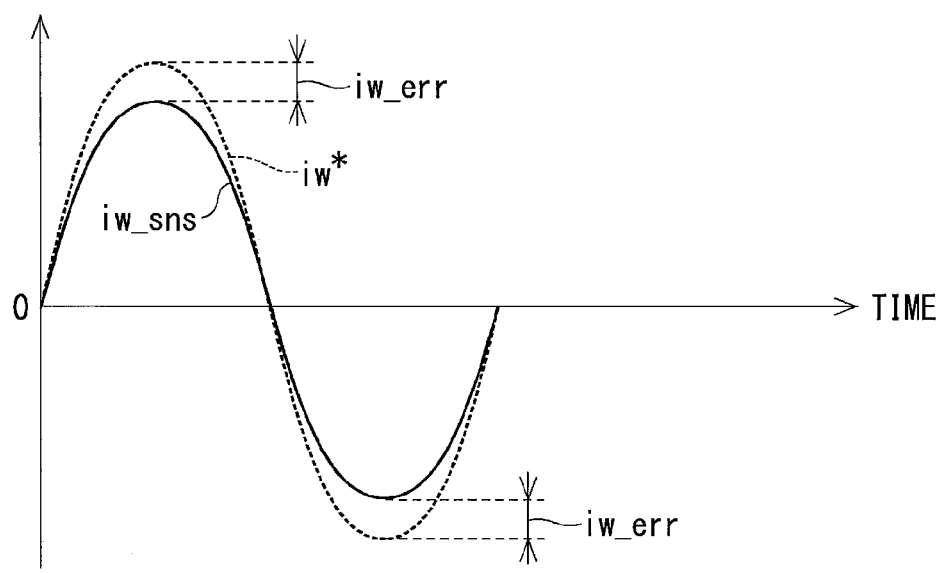

The torque abnormality monitoring part 43 monitors an abnormality in the output torque on the basis of an absolute value of a W phase error iw_err that is a difference between the W phase current command value iw* and the W phase current sensed value iw_sns, the W phase current command value iw* being a W phase component of the d axis current command value id* and the q axis current command value iq* (see FIGS. 12A and 12B). FIG. 12A shows an example when the amplitude of the W phase current sensed value iw_sns is larger than the amplitude of the W phase current command value i*, that is, an example when the output torque is excessively large. On the other hand, FIG. 12B shows an example when the amplitude of the W phase current sensed value iw_sns is smaller than the amplitude of the W phase current command value i*, that is, an example when the output torque is excessively small.

Specifically, when the absolute value of the W phase error iw_err is more than a first abnormality determination threshold value E20, it is determined that an abnormality is caused in the output torque.

Referring to the flow chart, in S107 shown in FIG. 9, when the absolute value of the W phase error iw_err is not more than the first abnormality determination threshold value E20, it is determined that an abnormality is not caused in the output torque and a negative determination is made in S107 and the routine proceeds to S109. When the absolute value of the W phase error iw_err is more than the first abnormality determination threshold value E20, it is determined that an abnormality is caused in the output torque and an affirmative determination is made in S107 and the routine proceeds to S108.

In the present embodiment, when the absolute value of the W phase error iw_err that is the difference between the W phase current command value iw* and the W phase current sensed value iw_sns is more than the first abnormality determination threshold value E20, the W phase current command value iw* being the W phase component of the d axis current command value id* and the q axis current command value iq* (S107: YES), it is determined that an abnormality is caused in the output torque. The d axis current command value id* and the q axis current command value iq* correspond to the torque command value trq* and the W phase current sensed value iw_sns corresponds to the output torque, so that when the W phase current sensed value iw_sns is different from the W phase current command value iw*, that is, when an absolute value r of the W phase error iw_err is more than the first abnormality determination threshold value E20, it is determined that an abnormality is caused in the output torque.

This construction can produce the same effects as the embodiments described above.

In the present embodiment, the torque abnormality monitoring part 43 constructs "a torque abnormality monitoring device". Further, the W phase current command value iw* corresponds to "a sensor phase current command value".

Fourth Embodiment

Figure 13:
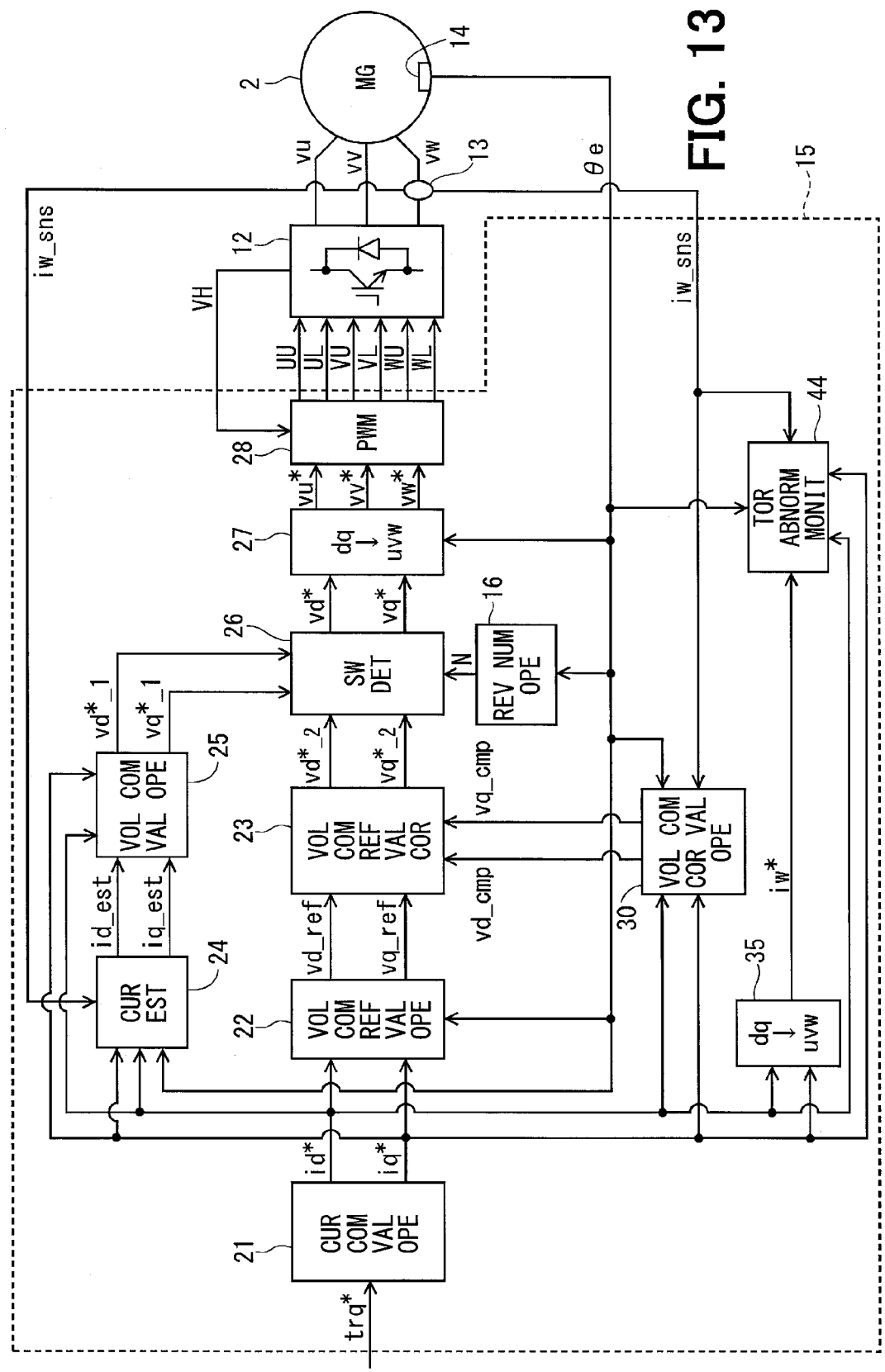
FIG. 13 is a block diagram to show a construction of a control section of a fourth embodiment of the present disclosure.

A fourth embodiment of the present disclosure is a modified example of the third embodiment. A control section 15 according to the present embodiment will be shown in FIG. 13.

In the present embodiment, a first abnormality determination threshold value E21 relating to an output torque abnormality determination based on the absolute value of the W phase error iw_err is made variable.

As shown in FIGS. 12A and 12B, the absolute value of the W phase error iw_err is varied according to the phase (θe+C+φ*) of the W phase current command value iw* or the phase (θe+C+φ) of the W phase current sensed value iw_sns. In this regard, C in the equation to express the phase is the same as the equations (8.2) and (9.2).

If the phase φ* of the current command vector i* is nearly equal to the phase φ of the current vector i, when the W phase current sensed value iw_sns is a peak, the W phase error iw_err becomes maximum, whereas when the W phase current sensed value iw_sns crosses zero, the W phase error iw_err becomes zero. In the present embodiment, in consideration of this, the first abnormality determination threshold value E21 is made variable according to the phase angle (θe+C+φ*) of the current command vector i*. The first abnormality determination threshold value E21 in the present embodiment is shown in an equation (11.1). Ep in the equation is a second abnormality determination threshold value (maximum value) at the time when the W phase current sensed value iw_sns is a peak, so it can be also said that the Ep in the equation is a value corresponding to the first abnormality determination threshold value E20 of the third embodiment.

$$E21 = Ep \times |\sin(\theta e + 240[°] + \phi^*)| \quad (11.1)$$

Further, when the equation (11.1) is generalized by the use of a constant C, the equation (11.1) is expressed by an equation (11.2)

$$E21 = Ep \times |\sin(\theta e + C + \phi^*)| \qquad (11.2)$$

In other words, in the example of the present embodiment, when (θe+240 [°]+φ*) is 60 [°], the first abnormality determination threshold value E21 is made ½ of the first abnormality determination threshold value (maximum value) Ep. Further, the first abnormality determination threshold value (maximum value) Ep itself may be made variable according to an operating point or the like.

In this regard, in order to prevent a false detection, as in the case of the second embodiment, when the W phase current sensed value iw_sns or the W phase current command value iw* is within the zero crossing range, it is desirable to stop monitoring an abnormality in the output torque. Further, it is also recommended to prevent the false detection within the zero crossing range by setting a lower limit value of the first abnormality determination threshold value E21.

Further, the first abnormality determination threshold value E21 may be made variable on the basis of the phase angle (θe+C+φ) of the W phase current sensed value iw_sns in place of the phase angle (θe+C+φ*) of the W phase current command value iw*.

Referring to the flow chart, in S107 shown in FIG. 9, when the first abnormality determination threshold value E21 is operated and where the absolute value of the W phase error iw_err is not more than the first abnormality determination threshold value E21, it is determined that an abnormality is not caused in the output torque and a negative determination is made in S107 and the routine proceeds to S109. When the absolute value of the W phase error iw_err is more than the first abnormality determination threshold value E21, it is determined that an abnormality is caused in the output torque and an affirmative determination is made in S107 and the routine proceeds to S108. In this regard, when the absolute value of the W phase current sensed value iw_sns is within the zero crossing range, it is desirable that a negative determination is made in S107 is and that the routine proceeds to S109.

In the present embodiment, the first abnormality determination threshold value E21 is made variable according to the phase (θe+C+φ*) of the W phase current command value iw* or the phase (θe+C+φ) of the W phase current sensed value iw_sns. This construction also can produce the same effects as the embodiments described above.

Further, in the third embodiment, substantially, an abnormality in the output torque is detected near the peak of the W phase current sensed value iw_sns, but in the present embodiment, an abnormality in the output torque can be detected within an angle range except for the zero crossing range of the W phase current sensed value iw_sns.

In the present embodiment, a torque abnormality monitoring part 44 constructs "a torque abnormality monitoring device".

Fifth Embodiment

Figure 14:
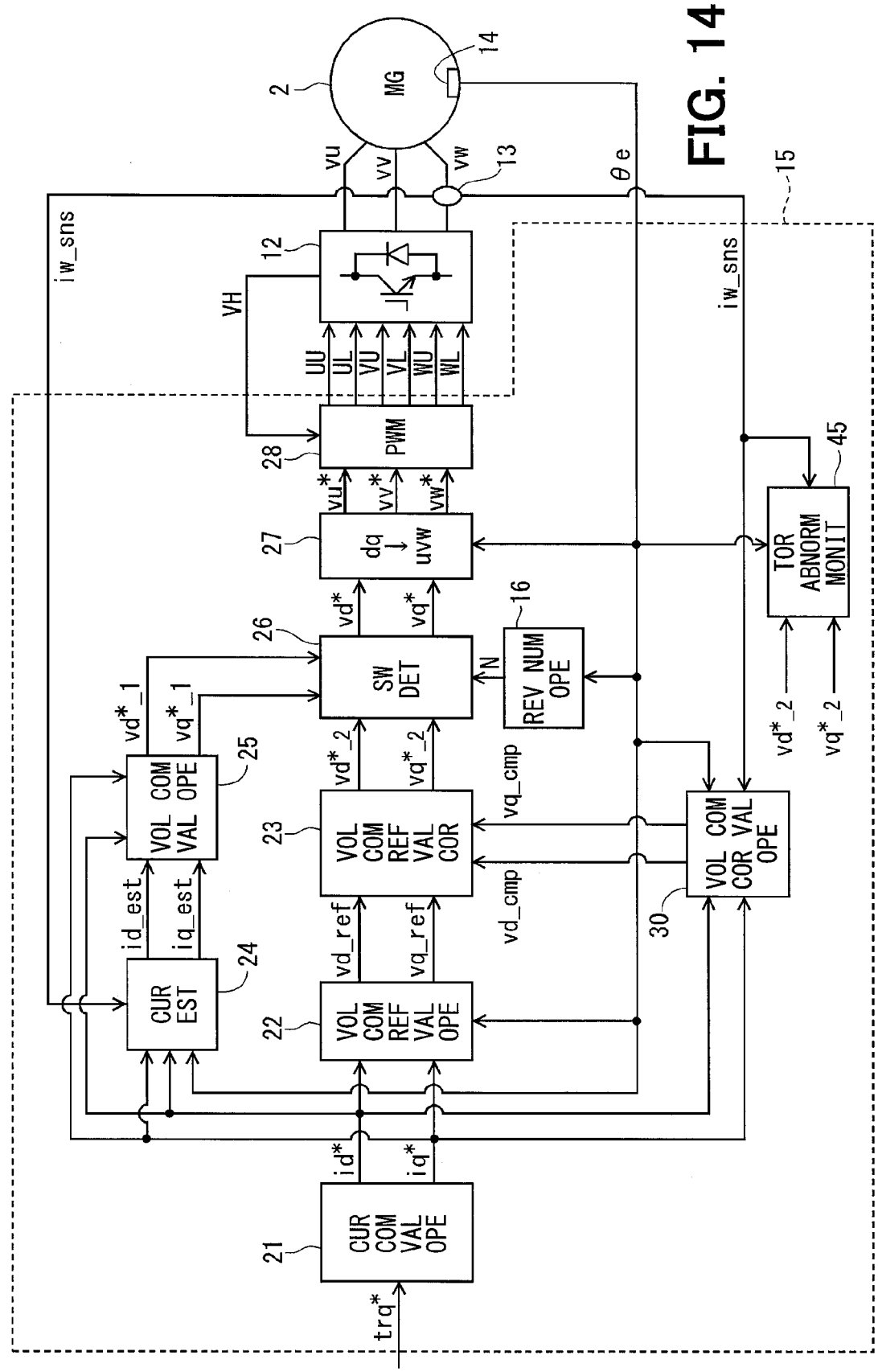
FIG. 14 is a block diagram to show a construction of a control section of a fifth embodiment of the present disclosure.

A control section 15 according to a fifth embodiment of the present disclosure will be shown in FIG. 14.

A torque abnormality monitoring part 45 of the present embodiment has the second d axis voltage command value vd*_2 and the second q axis voltage command value vq*_2 inputted thereto, the second d axis voltage command value vd*_2 and the second q axis voltage command value vq*_2 being operated by the voltage command reference value correction part 23.

It can be said that the second d axis voltage command value vd*_2 is a function of the d axis current and the electric angular velocity ω and that the second q axis voltage command value vq*_2 is a function of the q axis current and the electric angular velocity ω. Hence, for example, by solving a theoretical formula of an AC motor on the basis of the second d axis voltage command value vd*_2 and the second q axis voltage command value vq*_2, a d axis current converted value id_trn and a q axis current converted value iq_trn are operated. Further, the d axis current converted value id_trn and the q axis current converted value iq_trn are inversely dq transformed on the basis of the electric angle θe to thereby operate a W phase current converted value iw_trn. Then, when the absolute value of a difference between the W phase current converted value iw_trn and the W phase current sensed value iw_sns is more than a second abnormality determination threshold E30, it is determined that an abnormality is caused in the output torque.

In this regard, a method for operating a W phase current converted value iw_trn may be any method.

Referring to the flow chart, in S107 of FIG. 9, when the absolute value of the difference between the W phase current converted value iw_trn and the W phase current sensed value iw_sns is not more than the second abnormality determination threshold value E30, it is determined that an abnormality is not caused in the output torque and a negative determination is made in S107 and the routine proceeds to S109. When the absolute value of the difference between the W phase current converted value iw_trn and the W phase current sensed value iw_sns is more than the second abnormality determination threshold value E30, it is determined that an abnormality is caused in the output torque and an affirmative determination is made in S107 and the routine proceeds to S108.

In the present embodiment, when the absolute value of the difference between the W phase current converted value iw_trn and the W phase current sensed value iw_sns is more than the second abnormality determination threshold value E30 (S107: YES), the W phase current converted value iw_trn being a component of the W phase of a current value corresponding to the second d axis voltage command value vd*_2 and the second q axis voltage command value vq*_2, it is determined that an abnormality is caused in the output torque.

This construction also produces the same effects as the embodiments described above.

In the present embodiment, the torque abnormality monitoring part 45 constructs "a torque abnormality monitoring device". Further, the W phase current converted value iw_trn corresponds to "a sensor phase current converted value".

Sixth Embodiment

Figure 15:
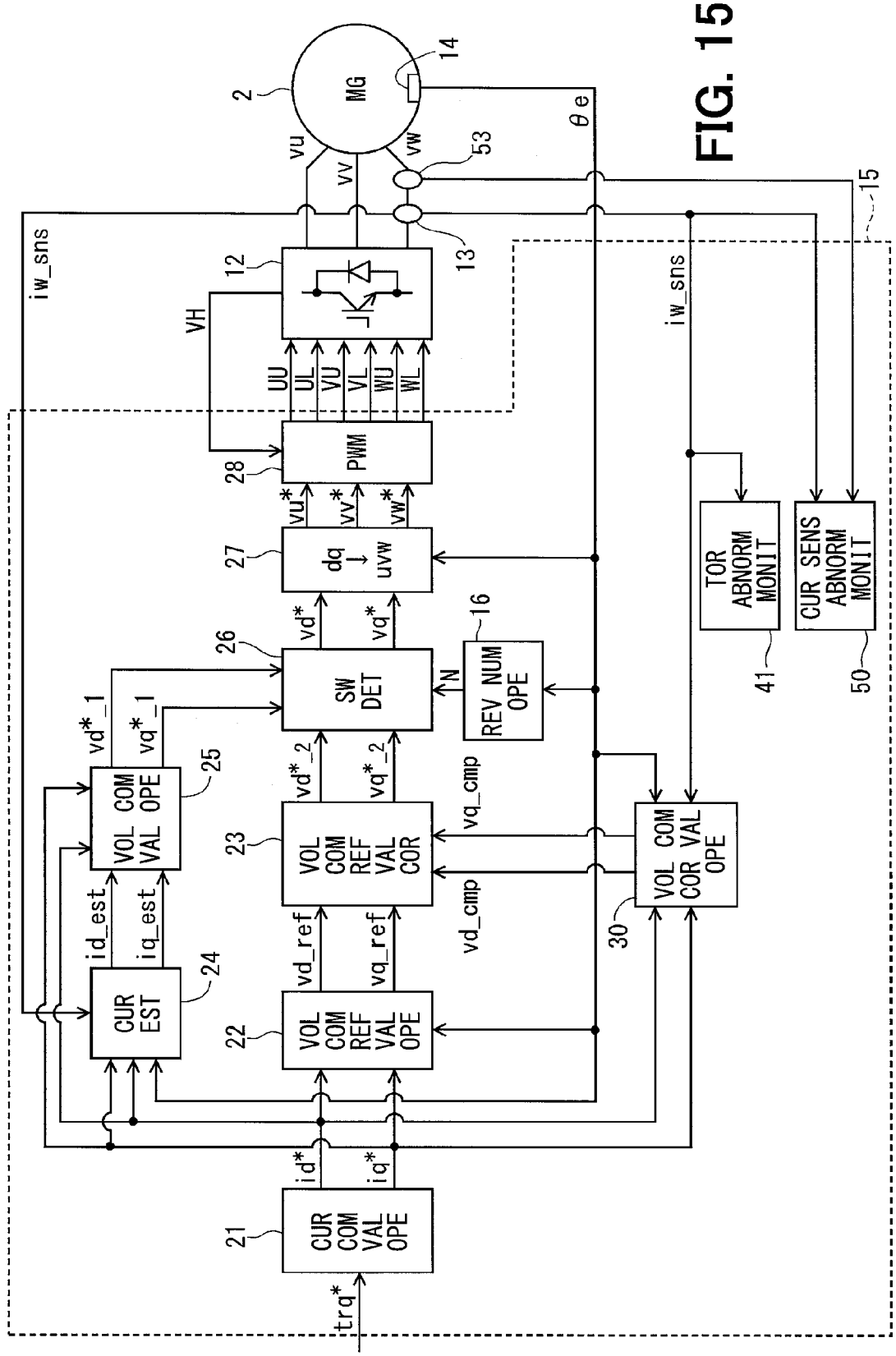
FIG. 15 is a block diagram to show a construction of a control section of a sixth embodiment of the present disclosure.

A control section 15 according to a sixth embodiment of the present disclosure will be shown in FIG. 15. A torque abnormality monitoring part 41 of the present embodiment is the same as the first embodiment but may be the torque abnormality monitoring parts 42 to 45 of the other embodiments.

In the present embodiment, the W phase of the sensor phase has not only the first current sensor 13 but also a second current sensor 53 provided therein. That is, in the present embodiment, the W phase has two current sensors provided therein, that is, a so-called "one-phase two-channel construction" is employed. The second current sensor 53 senses a monitoring phase current sensed value iw_mnt, which is the value of current to be passed through the W phase, so as to monitor an abnormality in the first current sensor 13. In this regard, the monitoring phase current sensed value iw_mnt is dependent of a control system and is not used for the drive control of the AC motor 2.

Further, the control section 15 is provided with a current sensor abnormality monitoring part 50 in addition to the construction of the embodiments described above.

The current sensor abnormality monitoring part 50 monitors whether or not an abnormality is caused in at least one of the first current sensor 13 and the second current sensor 53 on the basis of the W phase current sensed value iw_sns and the monitoring phase current sensed value iw_mnt. In the present embodiment, the so-called "one-phase two-channel construction" is employed, so that when the absolute value of a difference between the W phase current sensed value iw_sns and the monitoring phase current sensed value iw_mnt is more than a current sensor abnormality determination threshold value Ei, it is determined that an abnormality is caused in at least one of the first current sensor 13 and the second current sensor 53.

Figure 16:
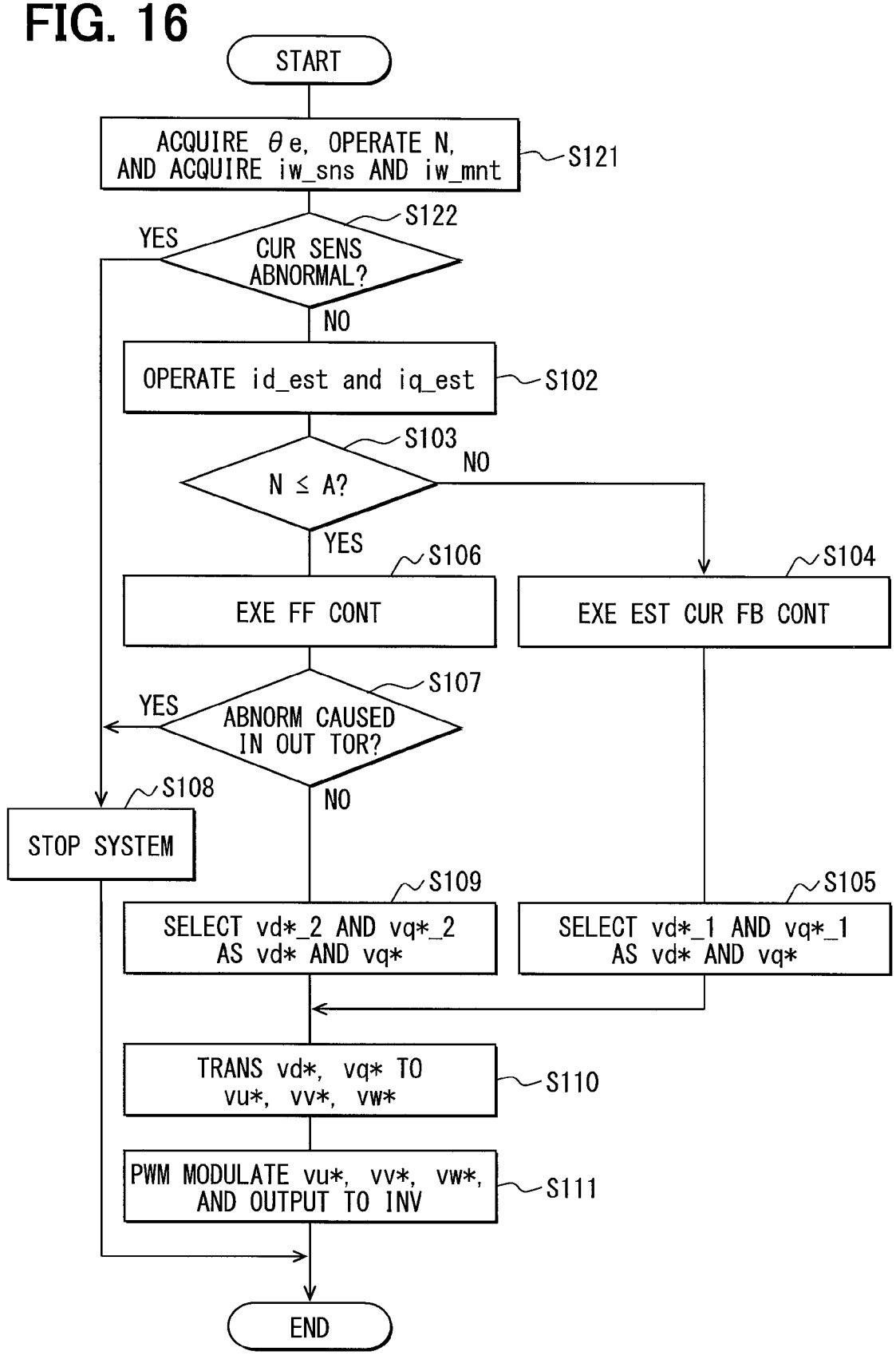
FIG. 16 is a flow chart to show drive control processing according to the sixth embodiment of the present disclosure.

Drive control processing according to the present embodiment will be described on the basis of a flow chart shown in FIG. 16. The flow chart shown in FIG. 16 is the same as the flow chart shown in FIG. 9 except that S121 is arranged in place of S101 of FIG. 9 and that S122 is arranged between S121 and S102.

In the first S121, the electric angle θe is acquired from the rotation angle sensor 14 and the number of revolutions N is operated. Further, the W phase current sensed value iw_sns is acquired from the first current sensor 13 and the monitoring phase current sensed value iw_mnt is acquired from the second current sensor 53.

In S122, it is determined whether or not an abnormality is caused in at least one of the first current sensor 13 and the second current sensor 53. When it is determined that the first current sensor 13 and the second current sensor 53 are normal (S122: NO), that is, when the absolute value of the difference between the W phase current sensed value iw_sns and the monitoring phase current sensed value iw_mnt is not more than the current sensor abnormality determination threshold value Ei, the routine proceeds to S102. When it is determined that an abnormality is caused in at least one of the first current sensor 13 and the second current sensor 53 (S122: YES), that is, when the absolute value of the difference between the W phase current sensed value iw_sns and the monitoring phase current sensed value iw_mnt is more than the current sensor abnormality determination threshold value Ei, the routine proceeds to S108. When an affirmative determination is made in S122 and where the routine proceeds to S108, information to the effect that an abnormality is caused in at least one of the first current sensor 13 and the second current sensor 53 is outputted to the vehicle control circuit 9 and, for example, the control by the electric motor control device 10 is stopped as a procedure taken for the abnormality.

The control section 15 of the present embodiment acquires the monitoring phase current sensed value iw_mnt from the second current sensor 53 provided in a monitoring phase which is any one phase of the AC motor 2 (W phase in the present embodiment) (S121). Further, the current sensor abnormality monitoring part 50 monitors whether or not an abnormality is caused in at least one of the first current sensor 13 and the second current sensor 53 on the basis of the W phase current sensed value iw_sns and the monitoring phase current sensed value iw_mnt (S122).

In this way, the control section 15 of the present embodiment can monitor an abnormality in the first current sensor 13 and the second current sensor 53.

Further, the present embodiment can produce the same effects as the embodiments described above.

In the present embodiment, the control section 15 constructs "a monitoring phase current acquisition device" and "a current sensor abnormality monitoring device" as well as the respective device of the embodiments described above. In more detail, the current sensor abnormality monitoring part 50 constructs "a current sensor abnormality monitoring device".

Further, S121 in FIG. 16 constructs "a monitoring phase current acquisition device" as well as "a sensor phase current acquisition device", "a rotation angle acquisition device", and "a number-of-revolutions operation device", and S122 constructs "a current sensor abnormality monitoring device".

Still further, the W phase corresponds to "the sensor phase" and "the monitoring phase", and the monitoring phase current sensed value iw_mnt corresponds to "the monitoring phase current sensed value".

Other Embodiments (A) Monitoring of an Abnormality in Torque (i) In the first embodiment, an abnormality in the output torque is monitored on the basis of whether or not the sensor phase current sensed value is within the normality determination range. (ii) In the second embodiment, an abnormality in the output torque is monitored on the basis of the amplitude of the sensor phase current sensed value. (iii) In the third embodiment and the fourth embodiment, an abnormality in the output torque is monitored on the basis of the difference between the sensor phase current command value and the sensor phase current sensed value. (iv) In the fifth embodiment, an abnormality in the output torque is monitored on the basis of the sensor phase current converted value which is the sensor phase component of the current value corresponding to the second voltage command value.

In the other embodiment, an abnormality in the output torque may be monitored by combining parts or all of (i) to (iv). Further, this is ditto for the monitoring of an abnormality in the output torque in the sixth embodiment.

Further, any other value that can be considered to be an output torque may be used so as to monitor an abnormality in the output torque.

(B) The respective threshold values relating to the determination of an abnormality in the output torque may be set in advance on the basis of actual data or the like. Further, for example, the respective threshold values may be always operated by converting a torque threshold value by the use of the equation (7) or the like. It is desirable that the torque threshold value used for the conversion is set so as to avoid a false determination for an operation error, a delay time in detection, and a transient change. For example, if the torque command value trq* is 50 [Nm], the torque threshold value used for the conversion is set at 50 [Nm]±10 [Nm]. Further, for example, the torque threshold value used for the conversion is set at the torque command value trq*×0.8 to the torque command value trq*×1.2.

In this regard, for example, when the threshold value has a margin in the first embodiment, it is desirable to employ, for example, a construction in which an abnormality determination is made at the peak of the W phase current sensed value iw_sns so as to avoid a false determination.

(C) A determination threshold value of the number of revolutions which relates to switching between the FF control processing and the estimated current FB control processing can be set appropriately in consideration of the operation accuracy or the like of the estimated current FB control processing. Further, in the embodiments described above, the switching between the FF term correction processing and the estimated current FB control processing is made by one determination threshold value. In the other embodiment, in order to avoid hunting in the switching between the FF term correction processing and the estimated current FB control processing, the determination threshold value of the number of revolutions may be set at different values on the side in which the number of revolutions increases and on the side in which the number of revolutions decreases. That is, the determination threshold value of the number of revolutions may have hysteresis set on the side in which the number of revolutions increases and on the side in which the number of revolutions decreases. In this case, when it is assumed that a determination threshold value on the increasing side is Au and that a determination threshold value on the decreasing side is Ad, it is desirable that, for example, Au>Ad but it is acceptable that Au<Ad.

(D) In the embodiments described above, in the current estimation part, the d axis current estimated value and the q axis estimated value are operated by considering that the current command value is the estimated value for the phase other than the sensor phase.

An operation method in the current estimation part is not limited to this method but any method may be employed, if the method is performed on the basis of the current sensed value and the electric angle, and the method may use other parameter or the like. Further, the first voltage command value may be calculated by any method, if the method calculates the first voltage command value on the basis of the current command value and the current estimated value fed back, and the method may use other parameter or the like.

Still further, in the embodiments described above, the d axis current estimated value, the q axis current estimated value, the first d axis voltage command value, and the first q axis voltage command value are always operated irrespective of the number of revolutions. In the other embodiment, when the number of revolutions is more than a determination threshold value, the d axis current estimated value, the q axis current estimated value, the first d axis voltage command value, and the first q axis voltage command value are operated, whereas when the number of revolutions is not more than the determination threshold value, the operation of the d axis current estimated value, the q axis current estimated value, the first d axis voltage command value, and the first q axis voltage command value may be stopped.

Hereinafter, a current estimation method that the current estimation part can employ will be described by way of example.

(i) Operation Based on a Reference Angle, which uses a Current Command Phase, and an Amplitude For example, like JP-A 2004-159391, a current amplitude (Ia) is calculated by dividing a U phase current sensed value (Iu) by "a U phase current reference angle (θ'), which is generated from a current command phase angle and an electric angle", and current estimated values Iv, Iw of the other two phases are calculated by multiplying a sine value at an electric angle, which is shifted from the U phase current reference angle (θ') by ±120 [°], by the current amplitude (Ia) (equations 12.1 to 12.3)

$$Ia = Iu/[\sqrt{(1/3)} \times (\{-\sin(\theta')\})] \tag{12.1}$$

$$Iv = \sqrt{(1/3)} \times Ia \times (\{-\sin(\theta'+120[°])\}) \tag{12.2}$$

$$Iw = \sqrt{(1/3)} \times Ia \times (\{-\sin(\theta'+240[°])\}) \tag{12.3}$$

Hereinafter, in (ii) to (iv), the description will be made on the assumption that the sensor phase is the W phase.

(ii) Operation Based on the Sensor Phase Reference Phase using the Current Command Value An α axis current iα in an α axis direction, which corresponds to the sensor phase, and a β axis current iβ in a β axis direction, which intersects the sensor phase, are operated by the use of at least one of the U phase current command value iu* and the V phase current command value iv*, the W phase current sensed value iw_sns, and the electric angle θe, and the sensor phase reference current phase θx is calculated by an arctangent function (arctan) of the α axis current iα and the β axis current iβ. An operation equation of the sensor phase reference current phase θx will be shown in an equation (13).

$$\theta x = \tan^{-1}(i\beta/i\alpha) \tag{13}$$

Further, the U phase current estimated value iu_est or the V phase current estimated value iv_est are operated on the basis of the sensor phase reference current phase θx and the W phase current sensed value iw_sns, and the d axis current estimated value id_est and the q axis current estimated value iq_est are operated on the basis of the U phase current estimated value iu_est or the V phase current estimated value iv_est, the W phase current sensed value iw_sns, and the electric angle θe. In this regard, in the operation of the U phase current estimated value iu_est or the V phase current estimated value iv_est, there may be performed correction processing of avoiding "the zero division" of dividing something by zero and "the zero multiplication" of multiplying something by zero.

(iii) Operation by Differentiating α Axis Current

By focusing on that the α axis current iα and the β axis current iβ are in the relationship between "a sine wave and a cosine wave" and that a phase difference between the α axis current iα and the β axis current iβ is 90 [°], β axis current estimated value iβ_est is operated on the basis of an α axis current differentiated value Δiα. Here, when the operation in the control section is a discrete system, the Δ axis current differentiated value Δiα is delayed by a half of an electric angle movement Δθe with respect to an actual β axis current iβ. Taking this in consideration, it is preferable that the β axis current estimated value iβ_est is operated by correcting the actual β axis current iβ by a correction amount H obtained by multiplying an average value of the α axis current iα of the last time and the α axis current iα of this time by a half (Δθe/2) of the electric angle movement Δθe. Then, the sensor phase reference current phase θx is operated by the use of the α axis current iα and the β axis current estimated value iβ_est. The subsequent operations are the same as those in (ii).

(iv) Operation by a Recurrence Formula

By using that the W phase axis relatively rotates on the d-q coordinates of the rotating coordinate system, a W phase estimated error Δiw_est is integrated to thereby make the d axis current estimated value id_est and the q axis current estimated value iq_est asymptotic to the d axis actual current value id and the q axis actual current value iq, respectively.

A W phase current reference value iw_bf of a sensor phase component is operated on the basis of the d axis current estimated value id_est of the last time and the q axis current estimated value iq_est of the last time and the electric angle θe of this time, and the W phase estimated error Δiw_est, which is a difference between the W phase current reference value iw_bf and the W phase current sensed value iw_sns, is calculated. A corrected error KΔiw_est is calculated by multiplying the W phase estimated error Δiw_est by a gain K of a filter element, and a d axis corrected value id_crr and a q axis corrected value iq_crr in the sensor phase direction are calculated by the dq transformation on the assumption that Δiu=0 and Δiv=0. Then, the calculated d axis corrected value id_crr and the calculated q axis corrected value iq_crr are made a correction vector in the sensor phase direction and the correction vector is integrated on the d-q coordinates, whereby the d axis current estimated values id_est and the q axis current estimated values iq_est are operated. Moreover, the following operation may be employed: corrected values in an orthogonal direction orthogonal to the sensor phase are further operated; a resultant vector of the corrected values in the sensor phase direction and the corrected values in the orthogonal direction is made a correction vector; and the correction vector is integrated on the d-q coordinates.

(E) In the embodiments described above, the voltage command reference value is operated on the basis of the voltage equation that is the theoretical formula of the electric motor. In the other embodiment, the voltage command reference value may be operated on the basis of the current command value by any method, for example, by a map operation referring to a map stored in advance.

(F) In the embodiments described above, all of "the current estimated value", "the current command value", "the first voltage command value", "the voltage command reference value", and "the second voltage command value" have been described for the d-q coordinates. However, these values may be values based on the other phase or the other axis, if the values are values that can be used for the control of the AC motor.

(G) In the embodiments described above, the torque abnormality monitoring part has been described as a part of the control section of the electric motor control device. In the other embodiment, necessary information such as the current command value and the current sensed value may be sent to another control section (for example, other monitoring microcomputer or a vehicle control circuit of a superior level) and the operation may be performed by the other control section. Alternatively, the operation may be performed also by the control section of the electric motor control device and an abnormality in the output torque may be determined by comparing the results of both control sections. In this way, also an abnormality in the microcomputer itself in which the control section is stored can be mutually monitored.

(H) The inverter for controlling the voltage to be impressed on the AC motor may be controlled by any method. For example, the inverter may be so constructed as to be controlled by appropriately switching between the sine wave PWM control mode and the overmodulation PWM control mode.

(I) In the embodiments described above, the example has been described in which the first current sensor is provided in the W phase and in which the W phase is the sensor phase. In the other embodiment, the first current sensor may be provided in the U phase and the U phase may be the sensor phase. Alternatively, the first current sensor may be provided in the V phase and the V phase may be the sensor phase.

(J) In the sixth embodiment, the example has been described in which the second current sensor is provided in the W phase and in which the W phase is the monitoring phase. In the other embodiment, the second current sensor may be provided in the U phase and the U phase may be the monitoring phase. Alternatively, the second current sensor may be provided in the V phase and the V phase may be the monitoring phase. Moreover, the sixth embodiment has the construction in which the sensor phase is identical with the monitoring phase, that is, the so-called "one-phase two-channel construction". The other embodiment may employ a so-called "two-phase one-channel construction" in which the sensor phase and the monitoring phase are different from each other in the phase.

(K) In the embodiments described above, the rotation angle sensor senses the electric angle $\theta e$ and outputs the electric angle $\theta e$ to the control section. In the other embodiment, the rotation angle sensor may sense a mechanical angle $\theta m$ and may output the mechanical angle $\theta m$ to the control section and the mechanical angle $\theta m$ may be converted to the electric angle $\theta e$ in the control section. Further, the mechanical angle $\theta m$ may be made "the rotation angle sensed value" in place of the electric angle $\theta e$. Still further, the number of revolutions N may be calculated on the basis of the mechanical angle $\theta m$.

(L) In the embodiments described above, the AC motor is the three phase AC motor of the permanent magnet synchronous type. In the other embodiment, the AC motor may be an induction motor or the other synchronous motor. Further, each of the AC motors of the embodiments described above is the so-called motor generator having both of the function as the electric motor and the function as the generator. In the other embodiment, the AC motor may be an electric motor not having the function as the generator.

The AC motor may be so constructed as to operate as an electric motor for an engine and to start the engine. Further, the engine may not be provided. Still further, a plurality of AC motors may be provided and a power dividing mechanism for dividing the power of the plurality of AC motors may further be provided.

(M) Further, the control device of the AC motor according to the present disclosure may be applied not only to the system having one set of the inverter and the AC motor, as described in the above embodiments, but also to a system having two or more sets of the inverter and the AC motor. Further, the control device of the AC motor according to the present disclosure may be applied to a system of an electric train or the like having a plurality of AC motors connected in parallel to one inverter.

Still further, the control device of the AC motor is applied to the electric vehicle but may be applied to a machine other than the electric vehicle.

The above disclosure has the following aspects.

According to an aspect of the present disclosure, a control device of a three phase alternating current motor having an applied voltage, which is controlled by an inverter, the control device controls a drive of the motor, and includes: a sensor phase current acquisition device for acquiring a sensor phase current sensed value from a first current sensor, which is disposed on a sensor phase of the motor that is one of three phases of the motor; a rotation angle acquisition device for acquiring a rotation angle sensed value from a rotation angle sensor, which senses a rotation angle of the motor; a number-of-revolutions operation device for operating the number of revolutions of the motor based on the rotation angle sensed value; a current estimation device for operating a current estimated value according to the sensor phase current sensed value and the rotation angle sensed value; a first voltage command value operation device for operating a first voltage command value according to a current command value, which relates to the drive of the motor, and the current estimated value to be fed back; a voltage command reference value operation device for operating a voltage command reference value according to the current command value; a second voltage command value operation device for correcting the voltage command reference value in order to operate a second voltage command value; a control mode switching device for switching a control mode to a first control mode for generating a drive signal, which relates to a drive of the inverter, according to the first voltage command value when the number of revolutions is more than a predetermined switching determination threshold value, and for switching the control mode to a second control mode for generating the drive signal according to the second voltage command value when the number of revolutions is not more than the switching determination threshold value; and a torque abnormality monitoring device for monitoring an output torque, which is outputted from the motor, based on the sensor phase current sensed value when the control mode is the second control mode.

In the present disclosure, in a low rotation range in which the number of revolutions of the AC motor is not more than a switching determination threshold value, the voltage command reference value is operated on the basis of the current command value by the use of a theoretical formula of the AC motor (for example, voltage equation) or a map stored in advance in place of one phase control. However, there is a case where a theoretical voltage command reference value is made different from a voltage command value relating to the actual drive of the AC motor, which generates torque according to the command, by a physical factor and the like relating to the AC motor and the control device of the AC motor. In particular, when the drive of the AC motor is controlled on the basis of the theoretical voltage command reference value in the low rotation range when the AC motor is started or stopped, there is a possibility that an impressed voltage is not appropriate and hence the AC motor is likely not to be stably driven.

Hence, the present disclosure corrects the voltage command reference value and operates the second voltage command value and controls the drive of the AC motor in the second control mode based on the second voltage command value in the low rotation range. In this way, the AC motor can be stably controlled in the low rotation range from the time when the AC motor is started and driven until the time when the AC motor is stopped.

Further, considering the first current sensor as a kind of torque sensing device of the AC motor, in the first control mode in which the AC motor is controlled on the basis of the sensor phase current sensed value and the rotation angle sensed value, it can be considered that the AC motor is controlled on the basis of the output torque. On the other hand, in the second control mode, there is a case where the sensor phase current sensed value is not used for the operation of the second voltage command value, so that it cannot necessarily be said that the AC motor is controlled on the basis of the output torque. For this reason, in the second control mode, in order to ensure the same function safety as in the first control mode, the output torque needs to be monitored separately. When the output torque from the AC motor is monitored, it is desirable to directly monitor an actual output torque, for example, on the basis of the current sensed values of two phases. However, in a present embodiment, the first current sensor is provided only in one phase and hence an actual d axis current and an actual q axis current cannot be operated and torque conversion is difficult, that is, the output torque cannot be directly monitored.

Thus, the present disclosure monitors the output torque outputted from the AC motor on the basis of the sensor phase current sensed value. In this way, even in the low rotation range in which the number of revolutions of the AC motor is small, the present disclosure can stably drive the AC motor in the second control mode and can monitor the output torque and can ensure a function safety.

Alternatively, when the sensor phase current sensed value is outside a first normality determination range, the torque abnormality monitoring device may determine that an abnormality is caused in the output torque. Alternatively, when an amplitude of the sensor phase current sensed value is outside a second normality determination range, the torque abnormality monitoring device may determine that an abnormality is caused in the output torque. Alternatively, when an absolute value of a difference between a sensor phase current command value, which is a component of the sensor phase in the current command value, and the sensor phase current sensed value is outside a first abnormality determination threshold value, the torque abnormality monitoring device may determine that an abnormality is caused in the output torque. Further, the first abnormality determination threshold value may be variable according to a phase of the sensor phase current command value or a phase of the sensor phase current sensed value.

Alternatively, when an absolute value of a difference between a sensor phase current converted value, which is a component of the sensor phase in a current value corresponding to the second voltage command value, and the sensor phase current sensed value is outside a second abnormality determination threshold value, the torque abnormality monitoring device may determine that an abnormality is caused in the output torque. Further, the control device may further include: a monitoring phase current acquisition device for acquiring a monitoring phase current sensed value from a second current sensor, the monitoring phase current sensed value being provided in a monitoring phase of the motor that is another one of three phases of the motor; and a current sensor abnormality monitoring device for monitoring, whether an abnormality is caused in at least one of the first current sensor and the second current sensor, based on the sensor phase current sensed value and the monitoring phase current sensed value.

It is noted that a flowchart or the processing of the flowchart in the present application includes sections (also referred to as steps), each of which is represented, for instance, as S100. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A control device of a three phase alternating current motor having an applied voltage, which is controlled by an inverter, the control device controlling a drive of the motor, the control device comprising:
   a sensor phase current acquisition device for acquiring a sensor phase current sensed value from a first current sensor, which is disposed on a sensor phase of the motor that is one of three phases of the motor;
   a rotation angle acquisition device for acquiring a rotation angle sensed value from a rotation angle sensor, which senses a rotation angle of the motor;
   a number-of-revolutions operation device for operating the number of revolutions of the motor based on the rotation angle sensed value;
   a current estimation device for operating a current estimated value according to the sensor phase current sensed value and the rotation angle sensed value;
   a first voltage command value operation device for operating a first voltage command value according to a current command value, which relates to the drive of the motor, and the current estimated value to be fed back;

a voltage command reference value operation device for operating a voltage command reference value according to the current command value;

a second voltage command value operation device for correcting the voltage command reference value in order to operate a second voltage command value;

a control mode switching device for switching a control mode to a first control mode for generating a drive signal, which relates to a drive of the inverter, according to the first voltage command value when the number of revolutions is more than a predetermined switching determination threshold value, and for switching the control mode to a second control mode for generating the drive signal according to the second voltage command value when the number of revolutions is not more than the switching determination threshold value; and a torque abnormality monitoring device for monitoring an output torque, which is outputted from the motor, based on the sensor phase current sensed value when the control mode is the second control mode.

2. The control device according to claim 1,
wherein, when the sensor phase current sensed value is outside a first normality determination range, the torque abnormality monitoring device determines that an abnormality is caused in the output torque.

3. The control device according to claim 1,
wherein, when an amplitude of the sensor phase current sensed value is outside a second normality determination range, the torque abnormality monitoring device determines that an abnormality is caused in the output torque.

4. The control device according to claim 1,
wherein, when an absolute value of a difference between a sensor phase current command value, which is a component of the sensor phase in the current command value, and the sensor phase current sensed value is outside a first abnormality determination threshold value, the torque abnormality monitoring device determines that an abnormality is caused in the output torque.

5. The control device according to claim 4,
wherein the first abnormality determination threshold value is variable according to a phase of the sensor phase current command value or a phase of the sensor phase current sensed value.

6. The control device according to claim 1,
wherein, when an absolute value of a difference between a sensor phase current converted value, which is a component of the sensor phase in a current value corresponding to the second voltage command value, and the sensor phase current sensed value is outside a second abnormality determination threshold value, the torque abnormality monitoring device determines that an abnormality is caused in the output torque.

7. The control device according to claim 1, further comprising:
a monitoring phase current acquisition device for acquiring a monitoring phase current sensed value from a second current sensor, the monitoring phase current sensed value being provided in a monitoring phase of the motor that is another one of three phases of the motor; and
a current sensor abnormality monitoring device for monitoring, whether an abnormality is caused in at least one of the first current sensor and the second current sensor, based on the sensor phase current sensed value and the monitoring phase current sensed value.

* * * * *